(12) United States Patent
Matz et al.

(10) Patent No.: US 7,283,743 B2
(45) Date of Patent: Oct. 16, 2007

(54) SYSTEMS AND METHODS FOR ACTIVE MONITORING AND MANAGEMENT OF FIBER LINKS

(75) Inventors: Bret Allen Matz, Mechanicsburg, PA (US); Michael S. Cohen, Enola, PA (US); Richard Charles Downs, Elizabethtown, PA (US)

(73) Assignee: NeSTRONIX, Inc., Chantilly, VA (US)

( * ) Notice: Subject to any disclaimer, the term of this patent is extended or adjusted under 35 U.S.C. 154(b) by 597 days.

(21) Appl. No.: 10/350,338

(22) Filed: Jan. 24, 2003

(65) Prior Publication Data

US 2004/0126110 A1  Jul. 1, 2004

Related U.S. Application Data

(60) Provisional application No. 60/359,305, filed on Feb. 26, 2002.

(51) Int. Cl.
*H04B 10/08* (2006.01)
*H04B 17/00* (2006.01)
*H04K 1/00* (2006.01)

(52) U.S. Cl. .......................... 398/25; 380/256
(58) Field of Classification Search ............... 398/17, 398/20, 21
See application file for complete search history.

(56) References Cited

U.S. PATENT DOCUMENTS

| | | | |
|---|---|---|---|
| 4,435,850 A | 3/1984 | Bowen et al. | |
| 4,961,644 A | 10/1990 | Marsden | |
| 4,973,169 A | 11/1990 | Slonecker | |
| 5,485,296 A * | 1/1996 | Healey et al. | 398/40 |
| 5,864,625 A | 1/1999 | Rutledge | 380/381 |
| 6,178,025 B1 | 1/2001 | Hardcastle et al. | |
| 6,192,361 B1 | 2/2001 | Huang | 707/9 |
| 6,265,971 B1 | 7/2001 | Maier, Jr. et al. | 340/506 |

(Continued)

FOREIGN PATENT DOCUMENTS

GB  2 287 596 A  9/1995

(Continued)

OTHER PUBLICATIONS

"Multiwavelength Optical Networks: A Layered Approach" by Stern et al., Prentice-Hall, May 1999, pp. 607-654.*

(Continued)

*Primary Examiner*—Shi K Li
(74) *Attorney, Agent, or Firm*—Sterne Kessler Goldstein & Fox, P.L.L.C.

(57) ABSTRACT

Systems and methods for actively monitoring and managing the integrity of an optical fiber communications link. The optical fiber link integrity is monitored to guard against intrusions and other security breaches. In one embodiment, a local and a remote active monitoring system are coupled by four fiber paths that provide primary and back-up transmit and receive paths between communication equipment. In one embodiment, a security light signal is transmitted using a secondary wavelength that differs from the wavelength used to transmit a user data light signal and travels in an opposite direction relative to the user data light signal. An active monitoring system monitors both administrative information contained within the security light signal and the intensity of the security light signal to manage the integrity of the fiber optic link. Methods are provided to characterize events impacting the fiber optic link integrity.

18 Claims, 20 Drawing Sheets

U.S. PATENT DOCUMENTS

| | | | |
|---|---|---|---|
| 6,347,374 B1 | 2/2002 | Drake et al. | 713/200 |
| 6,442,694 B1 | 8/2002 | Bergman et al. | 713/201 |
| 6,484,261 B1 | 11/2002 | Wiegel | 713/201 |
| 6,530,087 B1 * | 3/2003 | Kobayashi et al. | 725/125 |
| 6,603,112 B1 * | 8/2003 | Medard et al. | 250/227.11 |
| 6,650,840 B2 * | 11/2003 | Feldman | 398/21 |
| 6,654,784 B1 * | 11/2003 | Wei | 709/203 |
| 6,728,380 B1 | 4/2004 | Zhu et al. | |
| 6,816,680 B2 * | 11/2004 | Purse et al. | 398/5 |
| 6,836,586 B2 | 12/2004 | Ueno | |

FOREIGN PATENT DOCUMENTS

| | | | |
|---|---|---|---|
| GB | 2 332 317 A | 6/1999 | |

OTHER PUBLICATIONS

"Principles of Communications" Third Edition by R. Ziemer et al., Houghton Mifflin, 1990, pp. 676-738.*

D. Harrington, et al., An architecture for Describing SNMP Management Frameworks, RFC 2217, The Internet Society, Jan. 1998, title page and electronically paginated Nos. 1-56.

Supplementary Partial European Search Report for EP 03 71 6173, Dated May 2, 2006, 4 pages.

Supplementary European Search Report for EP 03 71 6173, Dated Oct. 24, 2006, 4 pages.

Medard, M. et al., "Attack Detection in All-Optical Networks," OFC '98 Technical Digest, Feb. 1998, pp. 272-273.

Medard, M. et al., "Secure Optical Communications," IEEE Lasers and Electro-Optics Society Annual Meeting, Dec. 1-4, 1998, pp. 323-324.

Medard, M. et al., "Security Issues in All-Optical Networks," IEEE Network, vol. 11, Issue 3, May/Jun. 1997, pp. 42-48.

Munno, C. J. et al., "Tamper Detection of Fiber Optic Links Via Modulation Transfer Function Characterization," 28th Annual 1994 International Camahan Security Technology, Proceedings, IEEE, 1994, pp. 112-119.

* cited by examiner

| Configuration of the transmit paths at time of event | | | Description of event | Message Information | |
|---|---|---|---|---|---|
| Primary Path Status | Backup Path Status | Active Path | | Status | Command |
| UP | UP | Backup | Unit (Active Monitoring System) powered up. | None | Power on Reset |
| UP | UP | Backup | Unit detects that its peer has powered up. | Power on Reset Command Acknowledged | none |
| UP or DOWN | UP or DOWN | Primary, Backup or None | Unit powering down. | Power status = DOWN | None |
| UP or DOWN | UP or DOWN | Primary, Backup or None | Power up synchronization | Decision maker ready | None |
| UP | UP | Primary | Alarm detected on Primary Path. | Local S1 status = Backup | Switch S3 to Backup |
| UP | DOWN | Primary | Alarm detected on Primary Path. | Local S1 status = Backup | Switch S3 to Backup |
| UP | UP | Backup | Alarm detected on Primary Path. | none | Switch S3 to Backup |
| UP | UP | Backup | Alarm detected on Backup Path. | Local S2 status = Open | none |
| DOWN | UP | Backup | Alarm detected on Backup Path. | Local S2 status = Open | none |
| UP | UP or DOWN | Primary | Receiver overload condition detected | Local S3 status = Backup | none |
| UP or DOWN | UP | Backup | Receiver overload condition detected | Local S3 status = Primary | none |
| UP or DOWN | UP or DOWN | Primary, Backup or None | Reset both data paths to their primary paths. | Status of local S1, S2 or S3 if changed. | Switch S1 to primary, switch S2 to closed, switch S3 to primary. |
| UP | UP | Primary | Acknowledge the reset of both data paths to their primary paths. | Status of local S1, S2 or S3 if changed. | none |
| UP or DOWN | UP or DOWN | Primary, Backup or None | Reset both data paths to their primary paths and reinitialize baseline calculations. | Status of local S1, S2 or S3 if changed. | Switch S1 to primary, switch S2 to closed, switch S3 to primary, reinitialize baseline calculations. |
| UP | UP | Primary | Acknowledge the reset of both data paths to their primary paths and reinitialize baseline calculations. | Status of local S1, S2 or S3 if changed. | none |
| UP or DOWN | UP or DOWN | Primary or Backup | No data signal present at receiver. | Local Rx signal status = no signal. | none |
| UP or DOWN | UP or DOWN | Primary, Backup or None | Change operational mode. | Local operational mode | Change operational mode to match operational mode status. |

```
*************************** FSS Console *******************************
ACTIVE LINK CONFIGURATION (Press "Esc" to go back to Main Menu)

Tx Primary Link Status: (UP or DOWN)
Tx Backup  Link Status: (UP or DOWN)

SWITCH BOTH TX AND RX DATA PATHS TO THE PRIMARY LINK:

Enter 1 if equipment or cable changes have been made to the network

Enter 2 if NO equipment or cable changes have been made to the network

SWITCH TX DATA PATH TO THE BACKUP LINK:

Enter 3 if equipment or cable changes have been made to the network

Enter 4 if NO equipment or cable changes have been made to the network

Active Link (PRIMARY, BACKUP, OR NONE):
```

FIG. 14B

SYSTEMS AND METHODS FOR ACTIVE MONITORING AND MANAGEMENT OF FIBER LINKS

CLAIM TO PRIORITY

This application claims the benefit of U.S. Provisional Application No. 60/359,305, filed Feb. 26, 2002.

BACKGROUND OF THE INVENTION

1. Field of the Invention

The present invention relates to fiber optics and communication.

2. Background of the Invention

Fiber optics technology is used in networks to carry data. Optical fibers can carry data using optical signals at high data rates with very good signal quality. In a network, optical signals are generated by transmitters and sent over optical fibers to receivers.

Network security has become increasingly important. Unfortunately, optical fibers can be vulnerable to intrusion. For example, an intruder can bend a single-mode or multi-mode optical fiber to tap a portion of light traveling through a fiber. The intruder can then intercept data traveling in the optical signals carried by an optical fiber without causing a significant signal loss at a receiver. In this way, the security of a network can be compromised at a fiber link without anyone realizing it.

What is needed is an improved method and system for monitoring and managing optical fiber links. In particular, the integrity and quality of a fiber link needs to be monitored and managed.

SUMMARY OF THE INVENTION

The invention provides systems and methods for actively monitoring and managing an optical fiber link. Both the integrity and quality of a fiber link can be monitored and managed. The integrity of the optical fiber link is monitored to guard against intrusions and other security breaches. The quality of the fiber link is monitored to identify potential faults, such as, transmitter degradation, fiber failure, or other types of fiber link fault.

The invention provides an active monitoring system that actively manages and monitors an optical fiber link used to connect local and remote communications equipment. An active monitoring system is located at the local and remote communications equipment. The communications equipment can be any type of communications device, such as a router or switch that is used to exchange voice, video, or data signals.

In one embodiment, a local and a remote active monitoring system are coupled by four fiber paths that provide primary and back-up transmit and receive paths between communication equipment. A user data light signal is transmitted by the communications equipment and passively travels through the active monitoring system. The active monitoring systems continuously transmit security light signals between them. In one embodiment, a security light signal is transmitted using a secondary wavelength that differs from the wavelength of the user data light signal, and travels in an opposite direction relative to the user data light signal.

In a further feature of the invention, the active monitoring system transmits an administration message within the security light signal. The administration message provides status and/or command codes that provide information used to protect the integrity of the fiber paths between the communications equipment and coordinates the local and remote active monitoring systems operation. The administration message is not dependent on the protocol used to transmit the user data light signal, and as a result an active monitoring system can be used on fiber links using any type of protocol. In one embodiment, an encrypted code sequence is used to secure the contents of the administration message.

In a further feature of the invention, the active monitoring system contains a decision analysis system that includes a light intensity analyzer, a codec, and a decision maker. In one embodiment, the light intensity analyzer collects intensity measurements of a received security light signal. The light intensity analyzer processes these measurements and provides them to the decision maker. The codec decodes received administration messages from a remote active monitoring system and provides the decoded messages to the decision maker. The codec also encodes administration messages received from a local active monitoring system and transmits the encoded messages to a remote active monitoring system.

In a further feature of the invention, the decision maker includes an intensity-based event security manager, an administration message security manager, and a switch manager. The intensity-based event manager interprets information about the intensity of a received security light signal. Likewise, the administration message security manager interprets received administration message information. Based on the analysis of these two managers, a switch manager determines the position of switches that control which fiber path carries the user data light signals.

In further features of the invention, a series of methods are provided for generating, receiving and interpreting a security light signal carrying an administration message that is transmitted between two active monitoring systems. In one embodiment, a method is provided for characterizing an event that impacts the active monitoring system and a fiber path between the systems. The method includes examining intensity measurements of a received security light signal to characterize the specific nature of an event. For example, in one embodiment Fourier transforms can be used to generate an event signature based on intensity measurements gathered immediately before and after an event. This signature can then be compared to known signatures of different types of optical faults (e.g., cable breaks, intrusions, etc.) to specify the type of fault that occurred. In a further feature of the invention, windowing techniques can be used to selectively sample intensity measurements of the security light signal. The windowing techniques are used to balance the objectives of being able to detect events in real time, while also filtering out transient events that can impact the intensity of the received security light signal.

In a further feature of the invention, a series of user interfaces are provided that support the management and control of an active monitoring system. These interfaces also enable a user to effectively use the event characterization tools of an active monitoring system.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

FIG. 7 is a chart showing the status and command information that can be carried within an administration message, according to an embodiment of the invention.

FIG. 14B is a user interface screen shot that shows an implementation of a configuration interface used to configure an active monitoring system, according to an embodiment of the invention.

DETAILED DESCRIPTION OF THE INVENTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1A:
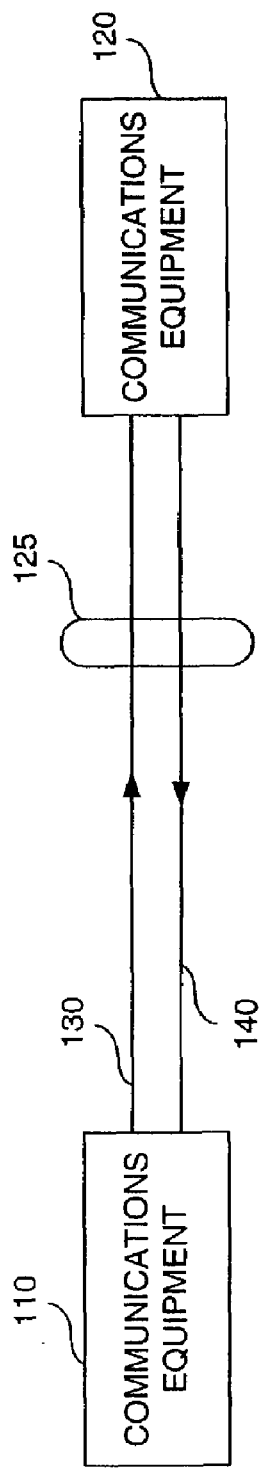
FIG. 1A is a diagram of an example communications system.

FIG. 1A is a diagram of an example communications system 100 that consists of communications equipment 110 and communications equipment 120 connected by fiber optic link 125. Fiber optic link 125 consists of fiber optic path 130 and fiber optic path 140 for carrying user data light signals in opposite directions. In general, a fiber optic link has a transmit and a receive path. A fiber optic path can be uni-directional or bi-directional in that data can be sent over the fiber optic path in one direction or in both directions. As a result, fiber paths for a fiber optic link can be provided within a single fiber or in two fibers. Communications equipment 110 and 120 can be any type of communications equipment, such as a router, switch, bridge, terminal equipment or an end user device. The equipment may be used to exchange voice, video, and/or data information in either a digital or analog format.

Fiber optic path 130 carries a user data light signal transmitted from communications equipment 110 to communications equipment 120. Thus, from the perspective of communications equipment 110, fiber optic path 130 is considered the user data light signal transmit path. Similarly, fiber optic path 140 carries a user data signal transmitted from communications equipment 120 to communications equipment 110. Thus, from the perspective of communications equipment 110, fiber optic path 140 is considered the user data light signal receive path. Light signals that carry data between communications equipment 110 and 120, are transmitted at a primary wavelength or user data light signal wavelength.

Figure 1B:
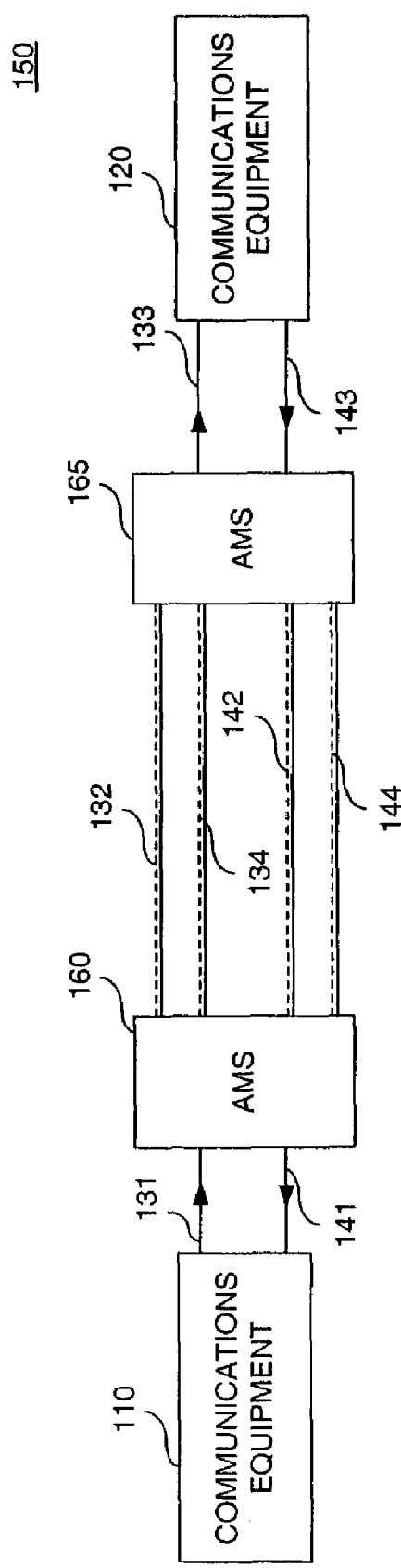
FIG. 1B is a diagram of an actively monitored communications system, according to an embodiment of the invention.

FIG. 1B is a diagram of an actively monitored communications system 150, according to an embodiment of the invention. Actively monitored communications system 150 consists of communications equipment 110, communications equipment 120, active monitoring system 160, active monitoring system 165, and fiber optic paths 131, 132, 133, 134, 141, 142, 143, and 144. Communications equipment 110 is coupled to active monitoring system 160 through fiber optic paths 131 and 141. Communications equipment 120 is coupled to active monitoring system 165 through fiber optic paths 133 and 143. Active monitoring systems 160 and 165 are coupled through fiber optic paths 132, 134, 142 and 144.

Active monitoring systems 160 and 165 monitor and/or manage the integrity and/or quality of the optical fiber communications paths between communications equipment 110 and communications equipment 120. The integrity of an optical fiber communications path is monitored to guard against intrusions and other security breaches. The quality is monitored to identify potential faults, such as, transmitter degradation, fiber failure, or other types of events. Active monitoring systems 160 and 165 exchange security light signals between them to monitor and manage the communications paths, and to coordinate their activities. Active monitoring systems 160 and 165 also contain intelligence to characterize the nature of events, and provide alarms and analysis to system administrators.

Fiber optic paths 132, 134, 142 and 144 carry two types of light signals between active monitoring systems 160 and 165. The first light signal is a user data light signal. This signal carries user data that is being transmitted between communications equipment 110 and 120. This data can include, for example, sensitive data files being transmitted from computer systems, video streaming data, or voice communications. As indicated above, this user data light signal is transmitted using a primary wavelength, such as 1310 nanometers (nm).

The second signal is a security light signal. This signal carries administration data that is being transmitted between active monitoring systems 160 and 165. This data can include, for example, status, control or other types of administration information that is exchanged between active monitoring systems 160 and 165 to monitor and manage the integrity of the communications link between communications equipment 110 and 120. In one embodiment, the security light signal is transmitted at a secondary wavelength that differs from the wavelength of the user data light signal. In one example, the user data light signal has a wavelength of 1310 nm, the secondary wavelength can be 1550 nm. Information about the integrity of the communications link between communications equipment 110 and 120 can be gathered from the digital contents of the security light signal and from the intensity (or analog component) of the security light signal.

These wavelengths are exemplary, and not intended to be limiting. Other combinations of different wavelengths can be used. For example, the wavelengths could be reversed, such that the primary wavelength is 1550 nm, and the secondary wavelength is 1310 nm. The principal factor in determining the wavelengths is the availability of fiber and optoelectronic devices that function effectively at the selected wavelengths.

As is discussed in greater detail below, active monitoring systems 160 and 165 contain optoelectronic switches that switch fiber optic paths to form a communications path between communications equipment 110 and communications equipment 120. For example, within active monitoring system 160 a switching function exists that couples fiber optic path 131 to either fiber optic path 132 or 134. Similarly, a switching function exists within active monitoring system 165 that couples fiber optic path 133 to either fiber optic path 132 or 134. The switches can be arranged such that fiber optic path 131 is coupled to fiber optic path 132 and fiber optic path 132 is coupled to fiber optic path 133. In this way, a complete communications path can be established between communications equipment 110 and communications equipment 120. The fiber optic path 131-132-133 would be equivalent to fiber optic path 130 shown in FIG. 1.

Alternatively, if the switches were arranged differently, a fiber optic path 131-134-133 could be created that would be equivalent to fiber optic path 130. Likewise, fiber optic path 141-142-143 could be created that would be equivalent to fiber optic path 140. Or, alternatively, if the switches were arranged differently, a fiber optic path 141-144-143 could be created that would also be equivalent to fiber optic path 140.

Fiber optic paths 132 and 134 are complementary to one another. Fiber optic path 132 is considered the primary path and fiber optic path 134 is considered the back-up path. Only one of fiber optic paths 132 or 134 will be in use to transmit user data at a given time. Likewise, fiber optic paths 142 and 144 are complementary to one another. Fiber optic path 142 is considered the primary path and fiber optic path 144 is considered the back-up path. Only one of fiber optic paths 142 or 144 will be in use to transmit user data at a given time. Thus, the optical paths 130 and 140 depicted in FIG. 1, have both a primary and back-up optical path as depicted in FIG. 1B. So, for example, if an intruder attempted to tap onto fiber path 132, active monitoring systems 160 and 165 could detect this attempted intrusion and automatically switch to a back-up path using fiber path 134. The switch could occur without significant service interruption and prevent a security breach that might compromise actively monitored communications system 150.

Once installed, active monitoring systems 160 and 165 provide passive operation in that they do not interfere with or regenerate the user data light signal, and are substantially transparent to communications equipment 110 and 120. As a result, in the event that an active monitoring system fails, the user data light signal would be substantially unaffected.

Figure 2:
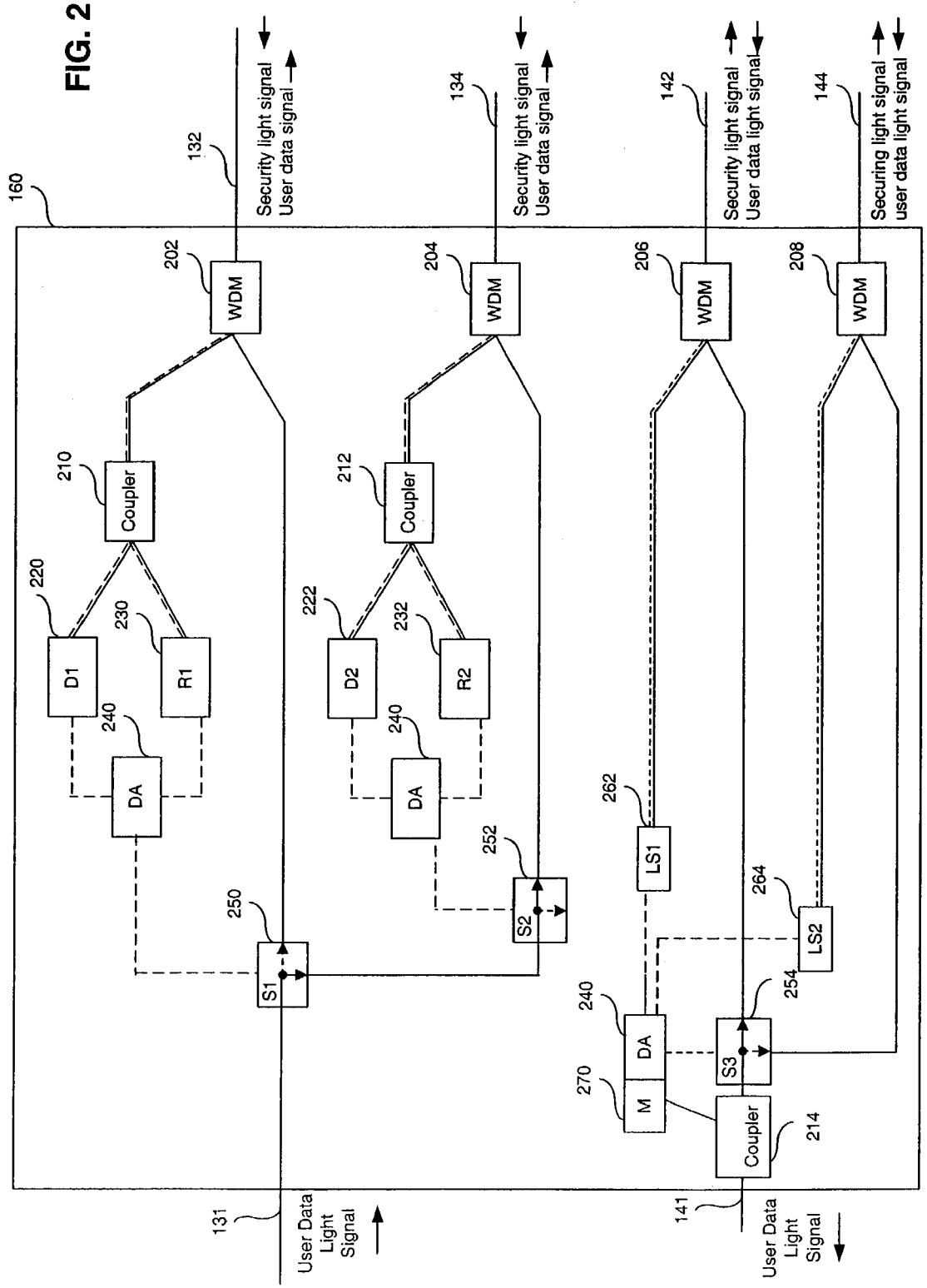
FIG. 2 is a diagram of an active monitoring system, according to an embodiment of the invention.

FIG. 2 provides a diagram of active monitoring system 160, according to an embodiment of the invention. Active monitoring system 160 and 165 contain the same type of components and operate in the same manner. FIG. 2 illustrates the components of active monitoring system 160 and also illustrates the paths on which light travels through the system. Active monitoring system 160 consists of wavelength division multiplexers 202, 204, 206 and 208;
  couplers 210, 212 and 214; light detectors 220 and 222; optoelectronic receivers 230 and 232; decision analysis system 240; optoelectronic switches 250, 252, and 254; light sources 262 and 264; and user data light signal monitor 270.

The components of active monitoring system 160 can be organized into four parts relative to fiber optic paths 132, 134, 142, and 144. In one embodiment, from the perspective of active monitoring system 160, fiber optic paths 132 and 134 can used to carry security light signals into active monitoring system 160 and carry user data light signals away from active monitoring system 160. In another embodiment, fiber optic paths 132 and 134 can be used to carry security light signals and user data light signals in the same direction. Likewise, from the perspective of active monitoring system 160, fiber optic paths 142 and 144 can used to carry security light signals away from active monitoring system 160 and carry user data light signals into active monitoring system 160.

When a security light signal enters active monitoring system 160 on fiber optic path 132, the security light signal enters wavelength division multiplexer 202. Wavelength division multiplexer 202 is coupled to both coupler 210 and optoelectronic switch 250. Wavelength division multiplexer 202 demultiplexes the security light signal, such that the security light signal is transmitted along a path to coupler 210. Coupler 210 allows a portion of the light security signal to be carried on a path toward optoelectronic receiver 230 and a portion of the light security signal to be carried on a path toward light detector 220. Optoelectronic receiver 230 and light detector 220 are coupled to decision analysis system 240. Optoelectronic receiver 230 extracts administration messages contained within the security light signal and provides them to decision analysis system 240. Light detector 220 measures the light intensity of the security light signal and provides intensity information to decision analysis system 240.

Similarly, when a security light signal enters active monitoring system 160 on fiber optic path 134 (instead of fiber optic path 132), the security light signal enters wavelength division multiplexer 204. Wavelength division multiplexer 204 is coupled to both coupler 212 and optoelectronic switch 252. Wavelength division multiplexer 204 demultiplexes the security light signal, such that the security light signal is transmitted along a path to coupler 212. Coupler 212 allows a portion of the light security signal to be carried on a path toward optoelectronic receiver 232 and a portion of the light security signal to be carried on a path toward light detector 222. Optoelectronic receiver 232 and light detector 220 are coupled to decision analysis system 240. Optoelectronic receiver 232 extracts administration messages contained within the light signal and provides them to decision analysis system 240. Light detector 222 measures the light intensity of the security light signal and provides intensity information to decision analysis system 240.

The transmission of administration information within a security light signal begins with instructions generated by decision analysis system 240. Decision analysis system 240 is coupled to light source 262 and light source 264. When decision analysis system 240 intends to transmit administration information within a security light signal on fiber optic path 142, decision analysis system 240 transmits an instruction to light source 262 to transmit an administration message. Light sources 262 and 264 are continuously or periodically transmitting a security light signal. Light source 262 is coupled to wavelength division multiplexer 206, and transmits the security light signal on a path to wavelength division multiplexer 206. Wavelength division multiplexer 206 multiplexes the security light signal with the user data light signal and the security light signal is transmitted on fiber optic path 142.

When decision analysis system 240 intends to transmit administration information within a security light signal on fiber optic path 144 (instead of fiber optic path 142), decision analysis system 240 transmits an instruction to light source 264 to transmit an administration message. Light source 264 is coupled to wavelength division multiplexer 208, and transmits the security light signal on a path to wavelength division multiplexer 208. Wavelength division multiplexer 208 multiplexes the security light signal with the user data light signal, and the security light signal is transmitted on fiber optic path 144.

The paths through active monitoring system 160 for a user data light signal are as follows. A user data light signal being transmitted from communications equipment 110 enters active monitoring system 160 on fiber optic path 131. The user data light signal travels on a path to optoelectronic switch 250. Optoelectronic switch 250 is coupled to wavelength division multiplexer 202 and optoelectronic switch 252. The user data light signal will be switched to either wavelenght division mulitplexer 202 or optoelectronic switch 252 depending on the position of optoelectronic switch 250. If the user data light signal is switched to the path leading to wavelength division multiplexer 202, the user data light signal will travel through wavelength division multiplexer onto fiber optic path 132.

If the user data light signal is switched to the path leading to optoelectronic switch 252, the user data light signal will travel to optoelectronic switch 252. Optoelectronic switch 252 is coupled to wavelength division multiplexer 204 and to an optical open condition or light trap. If the user data light signal is switched to the path leading to wavelength division multiplexer 204, the user data light signal will travel through wavelength division multiplexer 204 onto fiber optic path 134. Otherwise the user data light signal will be routed to an open path or light trap, and no user data light signal will be transmitted out of active monitoring system 160.

User data light signals are received on either fiber optic path 142 or 144. If a user data light signal is received on fiber optic path 142, the light travels through wavelength division multiplexer 206. Wavelength division multiplexer 206 is coupled to optoelectronic switch 254. Wavelength division multiplexer 206 passes the user data light signal onto optoelectronic switch 254. Alternatively, a user data light signal can enter active monitoring system 160 on fiber optic path 144. If a user data light signal is received on fiber optic path 144, the light travels through wavelength division multiplexer 208. Wavelength division multiplexer 208 is coupled to optoelectronic switch 254.

As indicated, optoelectronic switch 254 is coupled to wavelength division multiplexers 206 and 208. Additionally, optoelectronic switch 254 is coupled to coupler 214 and decision analysis system 240. Optoelectronic switch 254 is used to couple fiber optic path 141 with either fiber optic path 142 or 144. Decision analysis system 240 provides instructions to optoelectronic switch 254 on which path it should be switched to.

Finally, coupler 214 is coupled to fiber optic path 141, optoelectronic switch 254 and user data light signal monitor 270. Coupler 214 couples a small portion of the user data light signal to user data light signal monitor 270 and permits the remainder of the signal to travel over fiber path 141. User data light signal monitor 270 is also coupled to decision analysis system 240. As discussed in more detail below, in the event of a large variation in the intensity of the user data light signal, user data light signal monitor 270 will alert decision analysis system 240.

Figure 3:
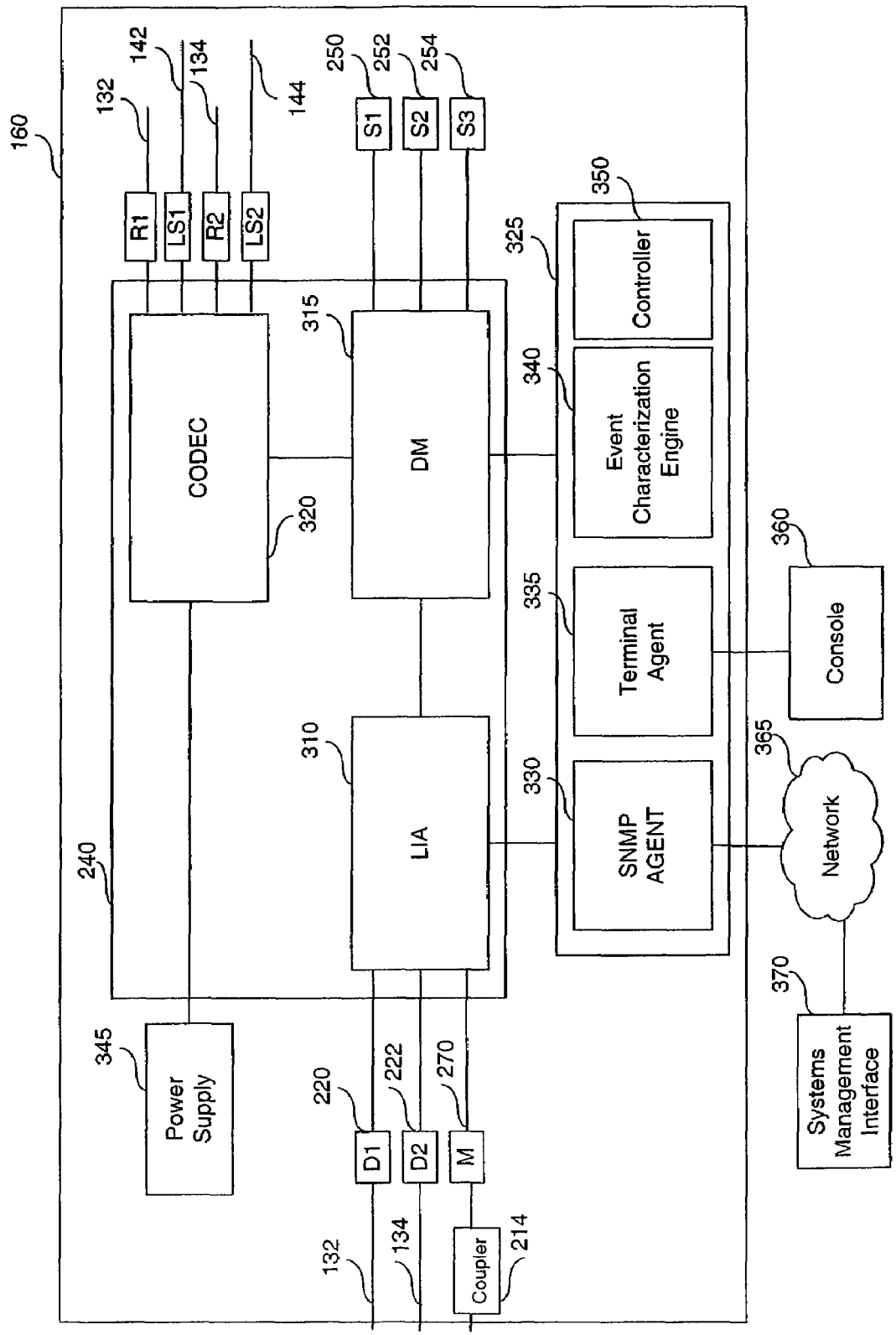
FIG. 3 is a diagram of an active monitoring system including control and analysis systems, according to an embodiment of the invention.

FIG. 3 provides a diagram of active monitoring system 160 including the control and analysis systems, according to an embodiment of the invention. The control and analysis systems consist of decision analysis system 240 and management system 325. In addition, power supply 345 provides power to all components within active monitoring system 160. Active monitoring system 160 can be coupled through management system 325 to network 365 and console 360. Network 365 and console 360 facilitate management control of active monitoring system 160. System management interface 370 provides a user interface to enable a user to manage an active monitoring system and analyze events. System management interface 370 can be used with either network 365. FIGS. 14A-14E provide embodiments of an implementation of the user interface.

Decision analysis system 240 consists of codec 320, light intensity analyzer 310, and decision maker 315. Management system 325 consists of SNMP agent 330, terminal agent 335, event characterization engine 340 and controller 350. Decision analysis system 240 and management system 325 can be implemented in software, hardware, firmware, or any combination thereof. Furthermore, the logical elements distinguished within decision analysis system 240 could be combined in one logical element or any combination thereof. Similarly, the logical elements distinguished with management system 325 could be combined in one logical element or any combination thereof.

Within decision analysis system 240, decision maker 315 is coupled to codec 320 and light intensity analyzer 310. In addition, decision maker 315 is coupled to optoelectronic switches 250, 252, and 254, and to event characterization engine 340. Codec 320 is coupled to light sources 262 and 264 and to optoelectronic receivers 230 and 232. Light intensity analyzer 310 is coupled to light detectors 220 and 222 and to user data light signal monitor 270.

Light intensity analyzer 310 receives light intensity measurements from light detectors 220 and 222, and user data light signal monitor 270. Light intensity analyzer 310 processes this information and provides the processed information to decision maker 315. In one embodiment, light intensity analyzer 310 includes three queues—sample queue, interim queue, and baseline queue—as described further with respect to FIG. 10 and FIG. 16.

Codec 320 digitally decodes and encodes administration messages that are transmitted between active monitoring systems 160 and 165. Codec 320 provides received administration messages to decision maker 315, and receives instructions to encode an administration message from decision maker 315. Decision maker 315 analyzes the light intensity information and/or administrative messages to monitor and manager the fiber optic paths. In particular, it controls the position of optoelectronic switches 250, 252 and 254. Additionally, upon the detection of a system event (e.g., an alarm on one of the fiber optic paths), decision maker 315 transmits information about the condition of the system and intensity of the security light signal to event characterization engine 340 for analysis. By providing this information to event characterization engine 340, detailed information about the event can be determined without slowing down the ongoing processing of real-time data used to monitor the fiber optic paths.

Within management system 325, SNMP agent 330 is coupled to system management interface 370 through network 365 to support administrative control of active monitoring system 160 by an end user. Additionally, terminal agent 335 can be coupled to console 360 to support basic functions to initialize active monitoring system 160 upon system start-up. Controller 350 provides basic control functions for management system 325.

Figure 4:
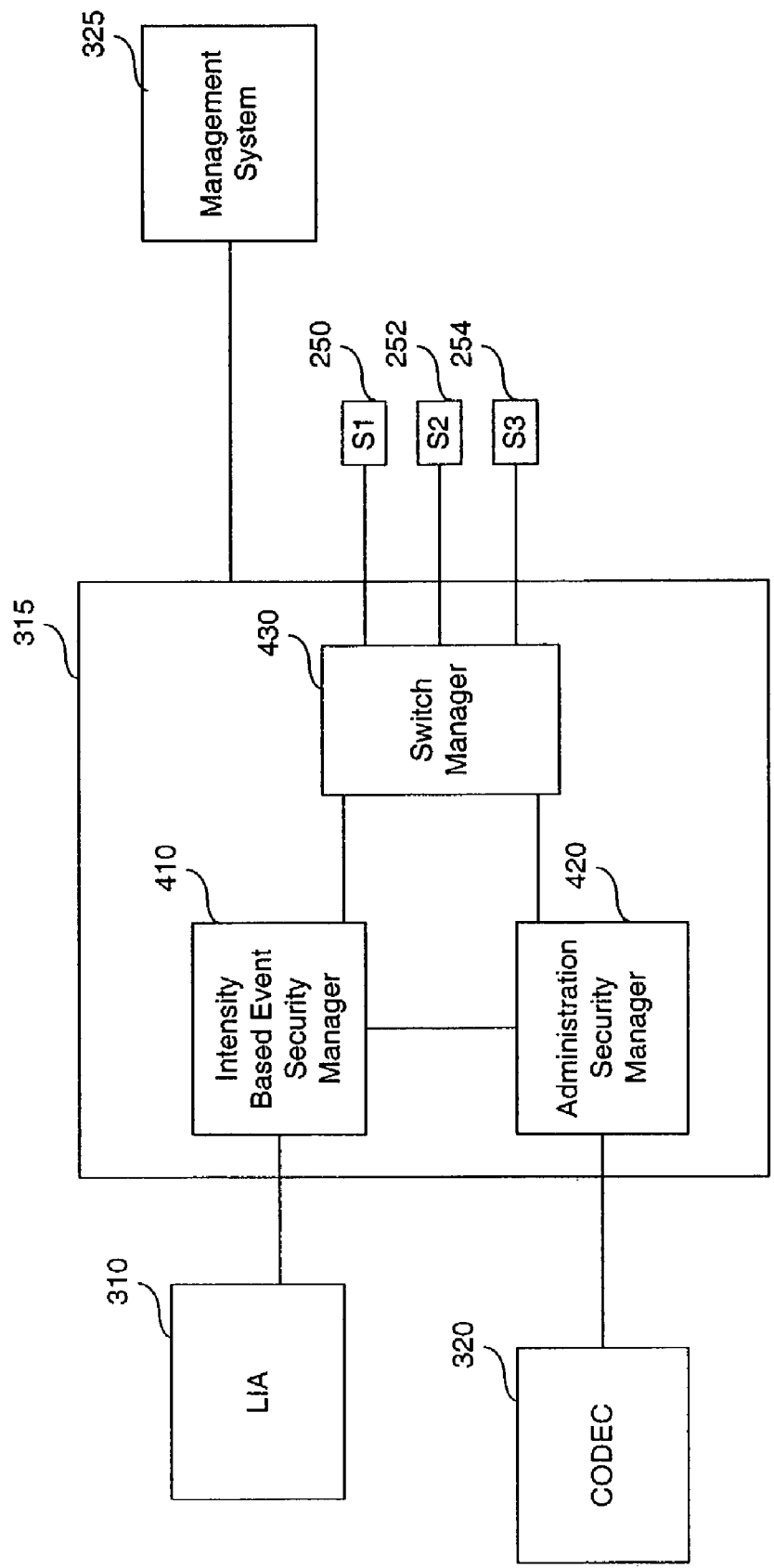
FIG. 4 is a diagram of a decision maker system, according to an embodiment of the invention.

FIG. 4 provides a diagram of a decision maker system, according to an embodiment of the invention. Decision maker system 315 consists of an intensity-based event security manager 410, an administration security manager 420 and a switch manager 430. Within decision maker system 315, switch manager 430 is coupled to both intensity-based event security manager 410 and administration security manager 420. Switch manager 430 is externally coupled to optoelectronic switches 250, 252, and 254. Intensity-based event security manager 410 and administration security manager 420 are coupled. Intensity based event security manager 410 is externally coupled to light intensity analyzer 310, while administration security manager 420 is externally coupled to codec 320. Finally, decision maker 315 is coupled to management system 325.

Intensity-based event security manager 410 receives data regarding the intensity of the security light signal from light intensity analyzer 310. Intensity-based event security manager 410 analyzes this information to determine whether an event, such as an alarm on one of the fiber paths, has occurred. If it determines that an event has occurred, it will provide a control action to switch manager 430. Based on this information, information about the current status of active monitoring system 160 and information received from administration security manager 420, switch manager 430 will instruct optoelectronic switches 250, 252 and 254 to switch to a particular position.

Similarly, administration security manager 420 receives data regarding the administrative status of active monitoring system 160 from codec 320. Administration security manager 420 analyzes this information to determine whether an event, such as active monitoring system 165 switching fiber paths, has occurred. If it determines that an event has occurred, it will provide a control action to switch manager 430. Switch manager 430 will then instruct optoelectronic switches 250, 252 and 254 to switch to a particular position.

Whenever an event occurs, decision maker 315 will provide information regarding the event to management system 325 for display to end users through SNMP agent 330 and for further analysis by event characterization engine 340.

Figure 5:
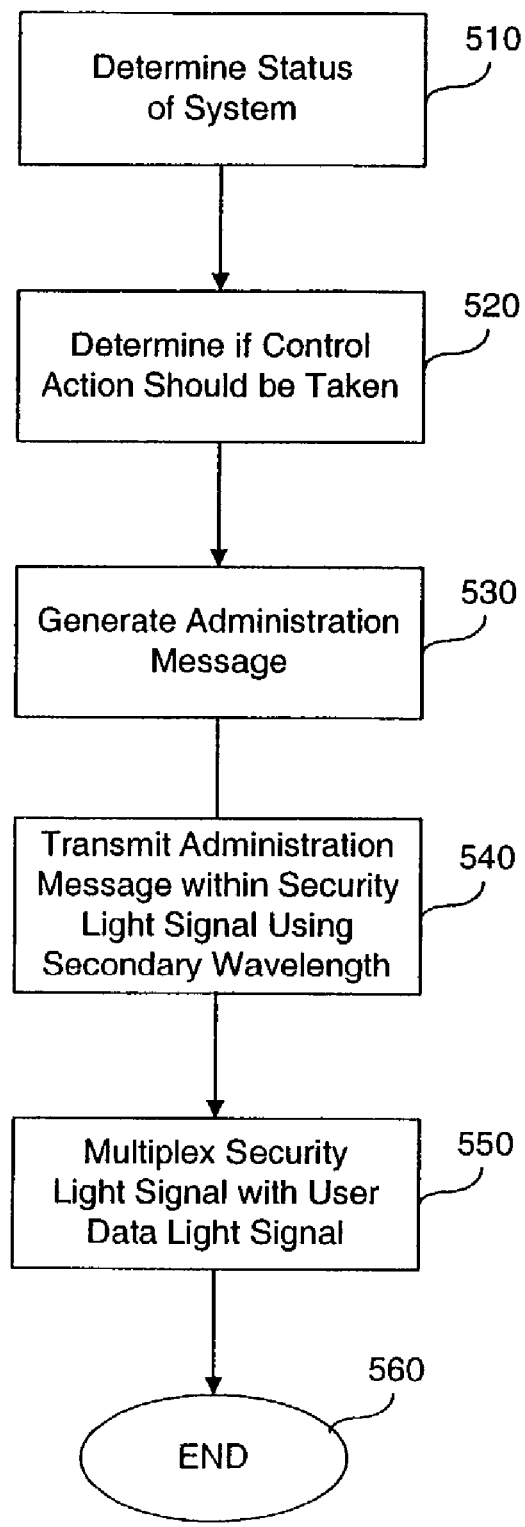
FIG. 5 is a flow chart of a method to generate and transmit administration messages, according to an embodiment of the invention.

The flow chart illustrated in FIG. 5 depicts a method 500 to generate and transmit administration messages, according to an embodiment of the invention. In one embodiment, method 500 is used to generate and transmit administration messages from a local active monitoring system, such as active monitoring system 160 to a remote active monitoring system, such as active monitoring system 165. Method 500 provides a method for active monitoring systems 160 and 165 to monitor the integrity of the fiber paths connecting them and to communicate information between them. Method 500 begins in step 510. In step 510, a status of an actively monitored communications system, such as system 150, is determined. In one embodiment, a decision analysis system, such as decision analysis system 240, gathers information from a received administration message and/or the intensity of a security light signal to determine the status of the system. In another embodiment, decision analysis system 240 can receive an alert from a user data light signal monitor, such as user data light signal monitor 270.

Figure 6:
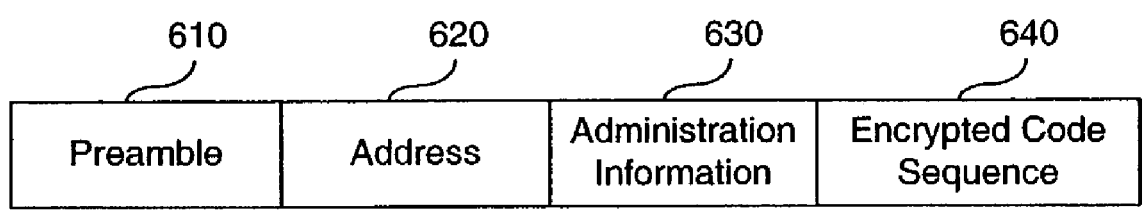
FIG. 6 is a diagram of a format for an administration message, according to an embodiment of the invention.

In step 520, a determination is made as to whether a control action should be taken. For example, in one embodiment if an alarm is detected on fiber path 132, a control action may be generated to switch to fiber path 134. In step 530, an administration message is generated. FIG. 6 illustrates the format of administration messages and FIG. 7 illustrates several examples of the type of status and command information that can be carried in an administration message. In one embodiment, the administration message contains status information about the current status of the system and command information about what actions should be taken.

In step 540, the administration message generated in step 530 is transmitted within a security light signal using a secondary wavelength. In step 550, the security light signal is multiplexed with a user data light signal. In step 560, method 500 ends.

FIG. 6 illustrates the format for administration messages, according to an embodiment of the invention. Administration message 600 consists of preamble 610, address 620, administration information 630 and an encrypted code sequence 640. In one embodiment, administration message 600 is a 32 byte word. Preamble 610 consists of overhead data used for formatting the administration message.

Address 620 consists of MAC address information for active monitoring systems 160 and 165. This information is used by the active monitoring systems to enhance security. The MAC address information consists of address information that uniquely identifies an active monitoring system. The presence of the MAC address information makes it more difficult for an intruder to tap into a fiber path and attempt to insert a signal that mimics a security light signal. This is the case, because the intruder would need to decipher the encrypted code sequence and determine the unique MAC addresses. In one embodiment, an active monitoring system compares address 620 and encrypted code sequence 640. If either of these is incorrect, an active monitoring system will take a control action to respond to a possible intrusion.

Administration information 630 contains the message payload in that it can contain status, control and/or other administrative information about actively managed communications system 150. Finally, encrypted code sequence 640 contains an encrypted code sequence used by active monitoring systems 160 and 165 to protect the security of the administration messages.

Because administration messages are transmitted in a light security signal that is independent from a user data light signal, active monitoring systems 160 and 165 are protocol insensitive. That is, active monitoring systems 160 and 165 can be used to monitor and manage the integrity of a fiber optic link connecting communications equipment regardless of the protocol being used by the communications equipment to transmit user data.

FIG. 7 provides a chart showing the status and command information that can be carried within an administration message, according to an embodiment of the invention. The first set of three columns identifies the configuration of the user data light signal transmit paths at the time of an event. The user data light signal transmit paths include the primary transmit path (e.g. fiber path 131-132-133) and a back-up transmit path (e.g., fiber path 131-134-133) that are currently designated for use to transmit user data from communications equipment 110 to 120.

Either the primary or back-up path will be the active path at any given time, in that user data will be carried on that path. When a path is inactive and not being used to carry a user data light signal, active monitoring system 160 also monitors the inactive path so that the condition of the path is always known. In other words, a security light signal is being exchanged on all the fiber paths between active monitoring system 160 and 165 during operation. In this way, an active monitoring system can always know whether a fiber path is available to carry a user data light signal. As depicted in FIG. 7, if an event occurs on an inactive path, an active monitoring system will respond to an event and take an appropriate control action. Thus, if a fiber path being used to carry user data does experience a fault, switching to another fiber path can be done quickly and with minimal impact on the user data light signal.

The chart also contains a column describing examples of the types of events that can occur. Events can be activities related directly to an active monitoring system or they can be alarms detected on the fiber paths that relate to the integrity of an actively monitored communications system. As discussed below, alarms can be subsequently characterized to determine a specific cause for the alarm. Examples of events include an active monitoring system powering down, alarm detected on primary path, and event detected on back-up path.

In the case of an active monitoring system powering down, prior to power supply 345 shutting down, active monitoring system 160 would transmit an administration message to active monitoring system 165. Upon receipt of the administration message, active monitoring system 165 would take a control action to ensure continuity of the fiber link, such that user data light signals would not be interrupted.

The chart also contains columns showing the type of information that would be transmitted in the administration information portion of an administration message. Examples of information that can be carried in the message information section include reconfiguring switches to switch from one fiber path to another.

Figure 8:
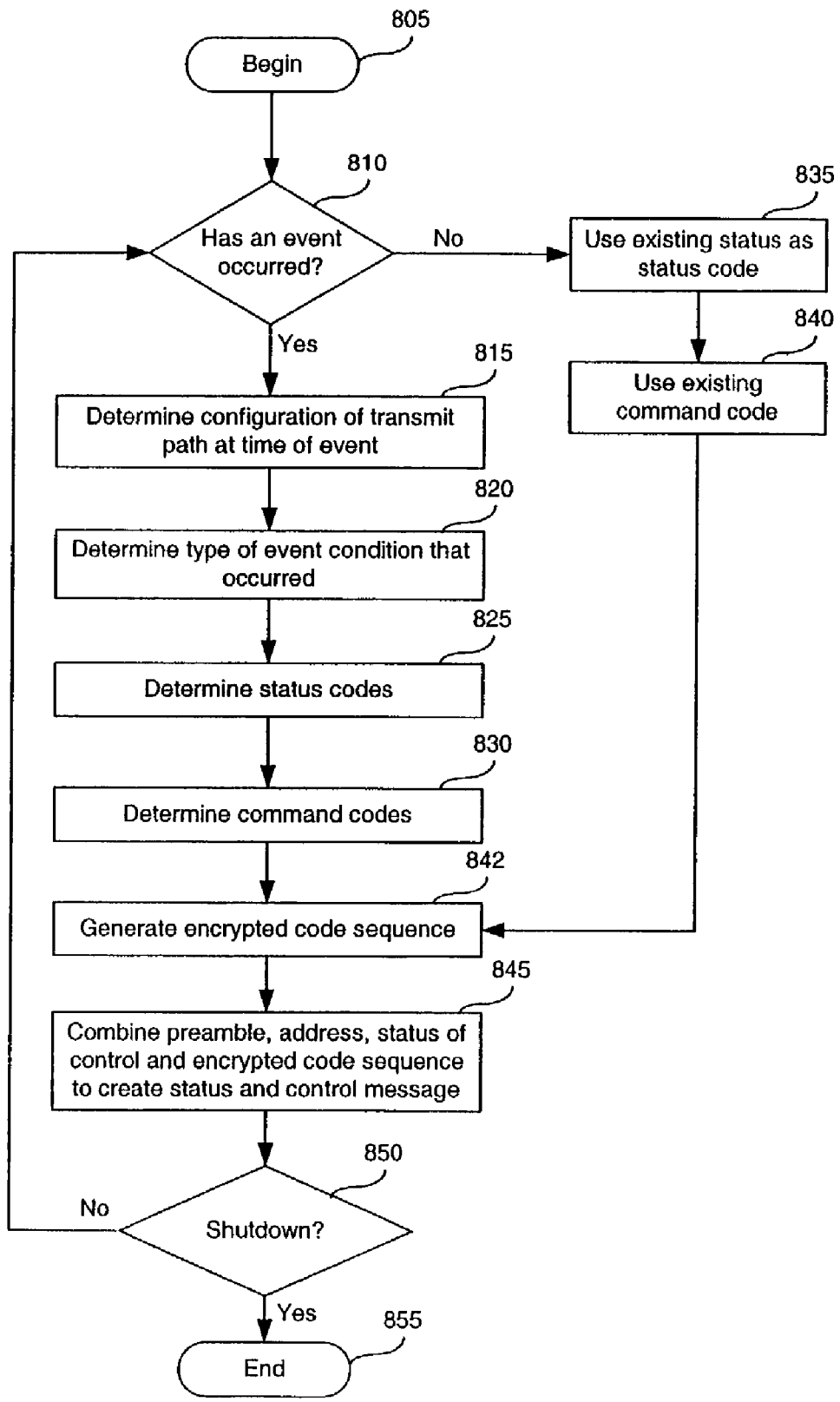
FIG. 8 is a flow chart of a method to generate an administration message, according to an embodiment of the invention.

The flow chart illustrated in FIG. 8 depicts method 800 to generate an administration message, according to an embodiment of the invention. FIG. 8 expands upon step 530 in method 500. Method 800 begins in step 805. In step 810, a determination is made whether an event has occurred. If an event has not occurred, method 800 proceeds to step 835. In step 835, a determination is made to use the existing status information to populate status information fields within an administration message. In step 840, a determination is made to use the existing command information to populate command information fields within an administration message. Method 800 then proceeds to step 842.

If an event has occurred in step 810, then method 800 proceeds to step 815. In step 815, a determination is made as to the configuration of the user data light signal transmit path at the time of the event. In step 820, a determination is made as to the type of event that occurred. In step 825, status codes are determined. In step 830 command codes are determined. In step 842 an encrypted code sequence is generated. In step 845, the preamble, address, status and command information for use in the administration information fields and the encrypted code sequence are combined to generate an administration message. In executing steps 810 through 845, a timer can be used to control the rate at which an administration message is transmitted. In one embodiment, a timer is set such that a one millisecond pause exists between the transmittal of subsequent administration messages. In step 850, a determination is made whether a request to shutdown has been received. If a shutdown request has not been received, method 800 loops back to step 810 and continues to monitor for additional events. If a shutdown request has been received, the method proceeds to step 855. In step 855, the method ends.

Figure 9:
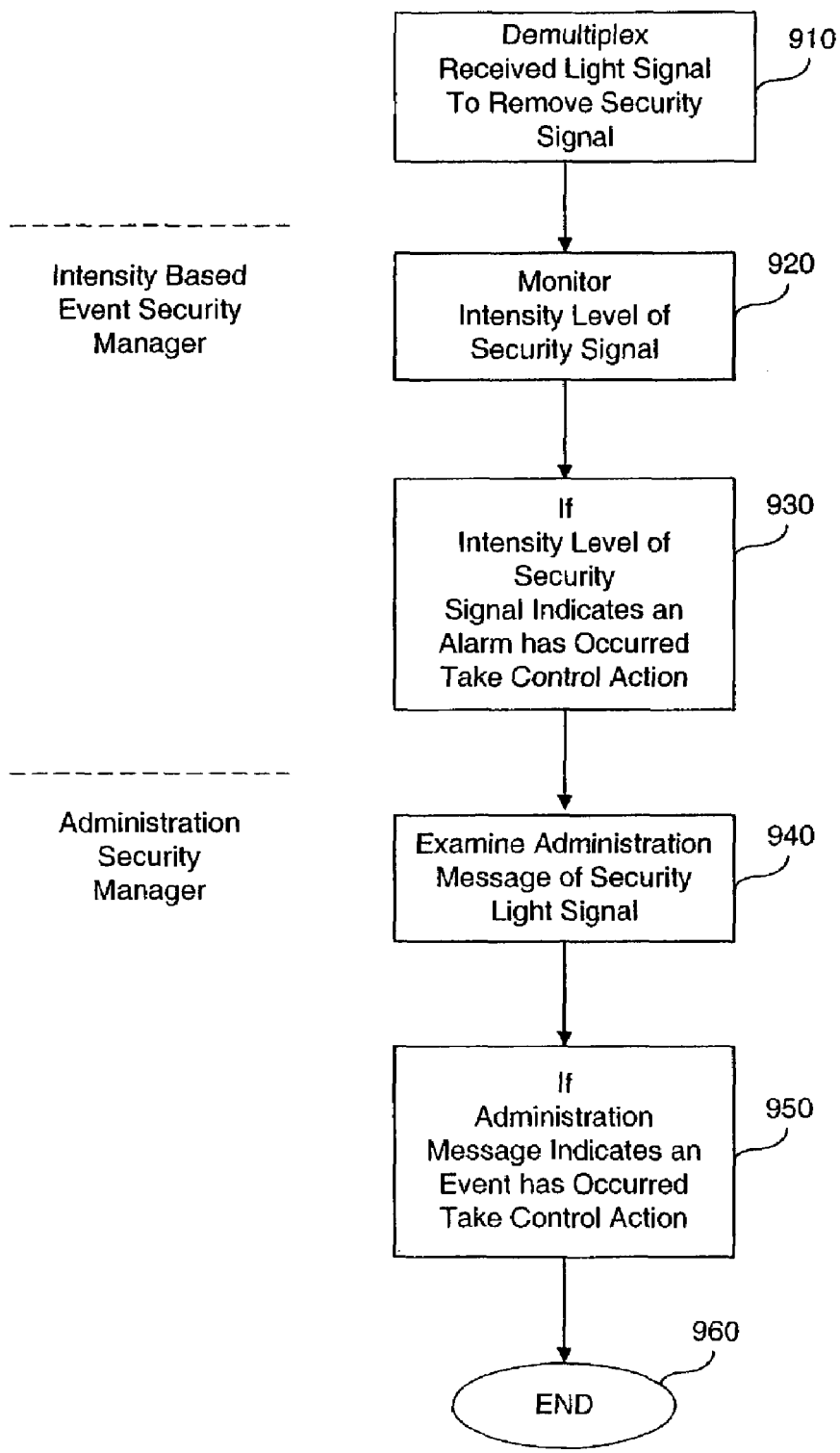
FIG. 9 is a flow chart of a method to receive and interpret security light signals, according to an embodiment of the invention.

The flow chart illustrated in FIG. 9 depicts a method 900 to receive and interpret administration messages, according to an embodiment of the invention. Method 900 begins in step 910. In step 910, a received light signal is demultiplexed to remove the light security signal. In one embodiment, the received light signal can be received on either fiber path 132 or 134. In step 920, an intensity level of the security light signal is monitored. For example, light detector 220 or light detector 222 can be used to monitor the intensity level of the received security light signal. In step 930, if the intensity level of the security light signal indicates an event has occurred, then a control action is taken. Examples of control actions can include instructing optoelectronic switches 250 or 254 to switch their positions to redirect the user data light signal. In step 940, an administration message contained in the security light signal is examined. In one embodiment, optoelectronic receiver 230 or 232 can receive the security light signal and provide administrative information to decision analysis system 240 for examination. In step 950, if the administration message indicates an event has occurred, then a control action is taken. Examples of control actions can include instructing optoelectronic switches 250, 252, or 254 to switch their positions to redirect the user data light signal. In step 960, method 900 ends.

Figure 10:
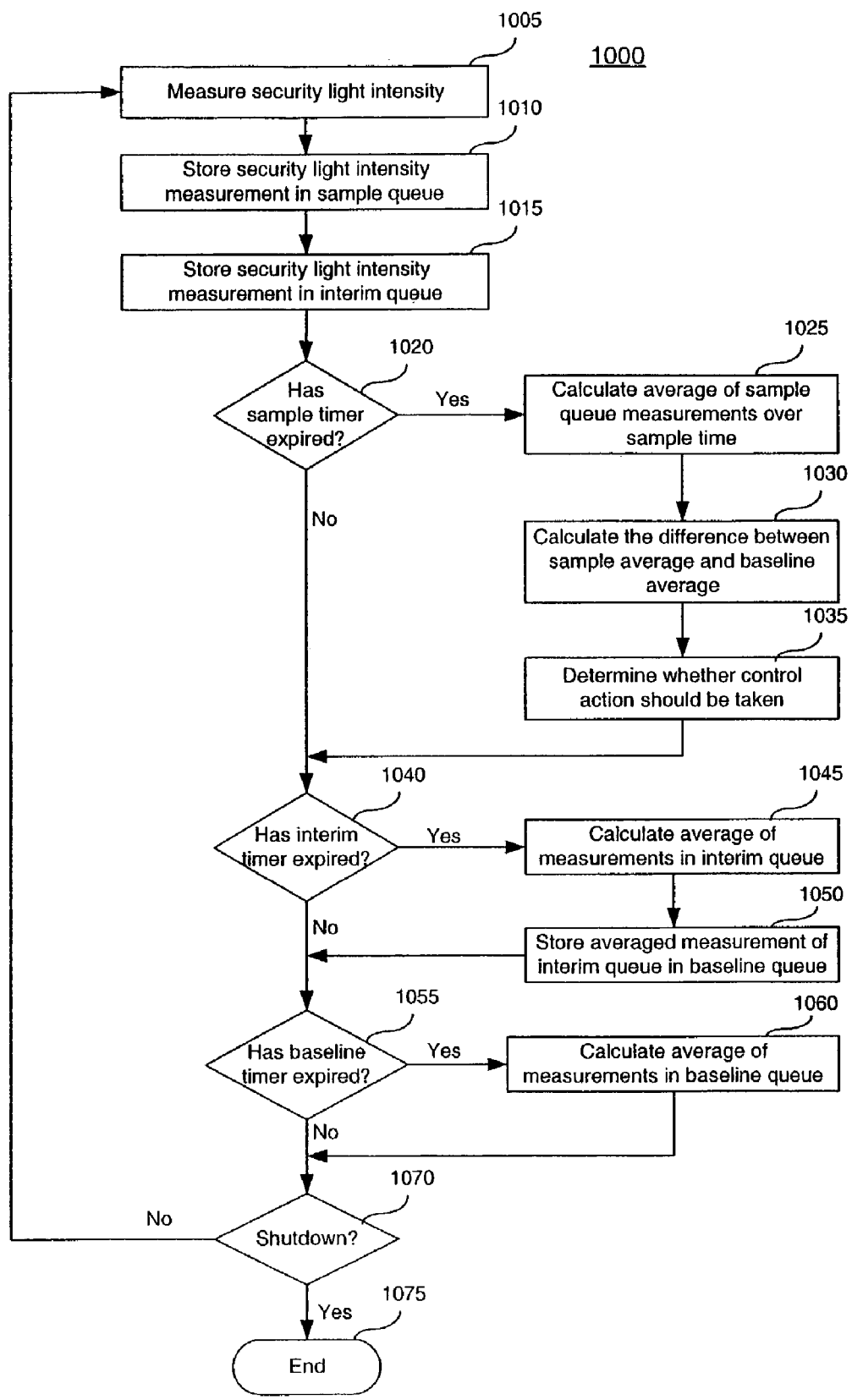
FIG. 10 is a flow chart of a method for monitoring the intensity level of a received security light signal, according to an embodiment of the invention.
Figure 15:
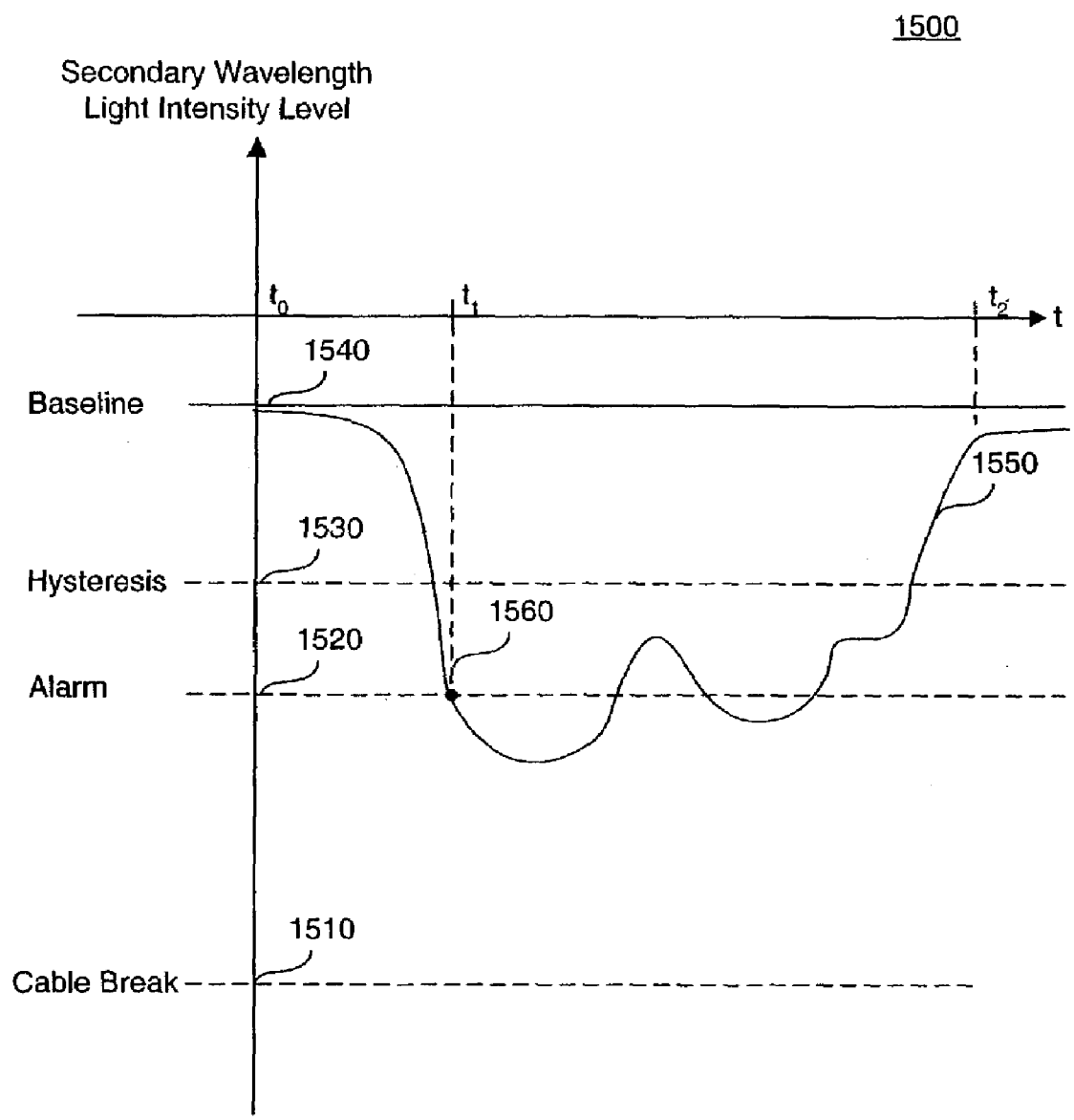
FIG. 15 is a chart illustrating an example of a security light signal intensity signature.
Figure 16:
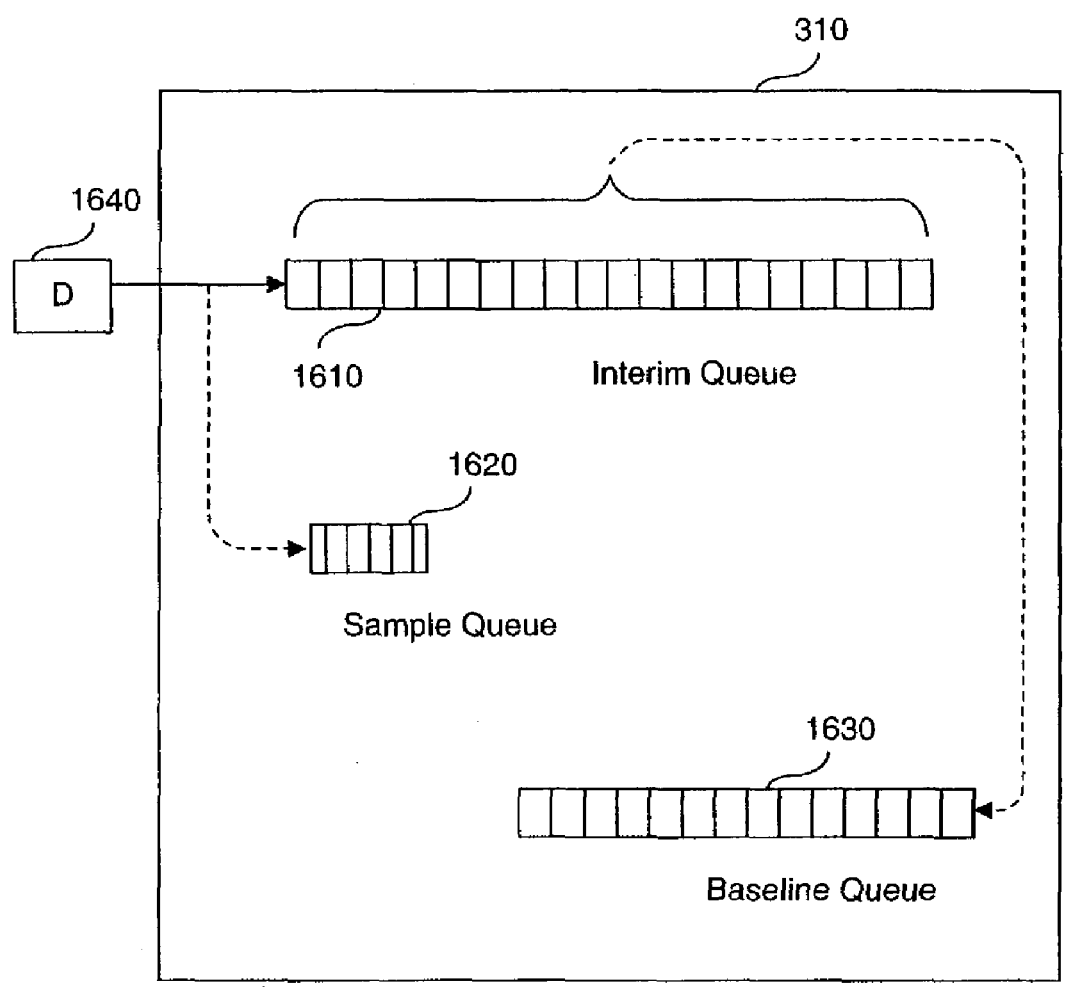
FIG. 16 is a diagram of queues used to store security light signal intensity measurements, according to an embodiment of the invention.

The flow chart illustrated in FIG. 10 depicts a method 1000 for monitoring the intensity level of a received security light signal, according to an embodiment of the invention. The illustrations in FIG. 15 and FIG. 16 can be used to help understand method 1000. FIG. 15 provides a chart illustrating an example of a security light signal intensity signature. The chart shows variations in the intensity measurements of a received security light signal as a function of time. FIG. 16 illustrates the queues used to store security light signal intensity measurements that are discussed within method 1000. In FIG. 16, light detector 1640 can be either light detector 220 or 222.

Method 1000 assumes that each of the queues—sample, interim, baseline—that are described below have been filled. In effect, method 1000 describes the monitoring of the intensity of a received security light signal after an active monitoring system has completed an initialization period. Method 1000 begins in step 1005. In step 1005, a security light signal intensity measurement is taken. In one embodiment, this can be accomplished by either light detector 220 or light detector 222. The measurements from light detector 220 and 222 can then be provided to a light intensity analyzer, such as light intensity analyzer 310.

In step 1010, the security light signal intensity measurement taken in step 1005 is stored in a sample queue located in light intensity analyzer 310. In step 1015, the security light signal intensity measurement taken in step 1005 is also stored in an interim queue located in light intensity analyzer 310. In step 1020, a determination is made whether a sample timer has expired. The sample timer measures the time for which measurements should be taken and stored in the sample queue before an average is taken. If the sample timer has expired, then method 1000 proceeds to step 1025. In step 1025, an average of all the measurements stored in the sample queue is calculated to generate an average sample measurement.

In step 1030 the difference between the average sample measurement and a baseline average is determined. In one embodiment steps 1010 through step 1030 are performed by a light intensity analyzer, such as light intensity analyzer 310. As discussed more completely below, the baseline average represents an average of security light signal intensity measurements over an extended period of time. In step 1035, a determination is made whether a control action should be taken based on the difference between the sample average and the baseline average. In one embodiment, in step 1035 a light intensity analyzer, such as light intensity analyzer 310 provides the sample and baseline averages to a decision maker, such as decision maker 315. Decision maker 315 would then determine whether to take a control action. Method 1000 then proceeds to step 1040.

If in step 1020, a determination was made that the sample timer had not expired, method 1000 proceeds directly to step 1040.

In step 1040, a determination is made whether an interim timer expired. The interim timer measures the time for which measurements should be taken and stored in the interim queue before an average of the interim queue is taken. If the interim timer has expired, then method 1000 proceeds to step 1045. In step 1045, an average of all measurements in the interim queue is calculated. In step 1050, the average of the interim queue is stored in the baseline queue. Method 1000 then proceeds to step 1055.

If in step 1040, a determination was made that the interim timer had not expired, method 1000 proceeds directly to step 1055.

In step 1055, a determination is made whether a baseline timer has expired. The baseline timer measures the time for which interim measurements will be placed into a baseline queue. If the baseline timer has expired, then the method 1000 proceeds to step 1060. In step 1060, an average of the measurements in the baseline queue is calculated and stored. Method 1000 then proceeds to step 1070

If in step 1055, a determination was made that the interim timer had not expired, method 1000 proceeds directly to step 1070.

In step 1070, a determination is made whether method 1000 has been shut down. If method 1000 has not been shutdown, the process loops back to step 1005. During normal operation method 1000 will continually loop through steps 1005 to 1070. Only when method 1000 has been shutdown will method 1070 proceed to step 1075 and end.

In one embodiment, steps 1040 through step 1060 are performed by a light intensity analyzer, such as light intensity analyzer 310. Furthermore, each of the sample, interim and baseline queues are stored in light intensity analyzer 310.

The duration of a sample timer is set to achieve the objective of providing a very short duration sample measurement, so that suspicious activity on the fiber paths can be quickly examined. Conversely, the baseline timer is set to a significantly longer duration to provide a rolling baseline average that provides an indication of the normal behavior of the security light signal that smooths out transient or other spurious measurements. The interim timer is set to an intermediate duration to balance the objectives of providing a measurement queue to provide near real-time measurements for analysis of measurements captured after an event is detected and to smooth out transient or other spurious measurements. In one embodiment, the duration of the sample timer is 12.8 milliseconds, the duration of the interim timer is 3.2 seconds and the duration of the baseline timer is 60 minutes.

Figure 11:
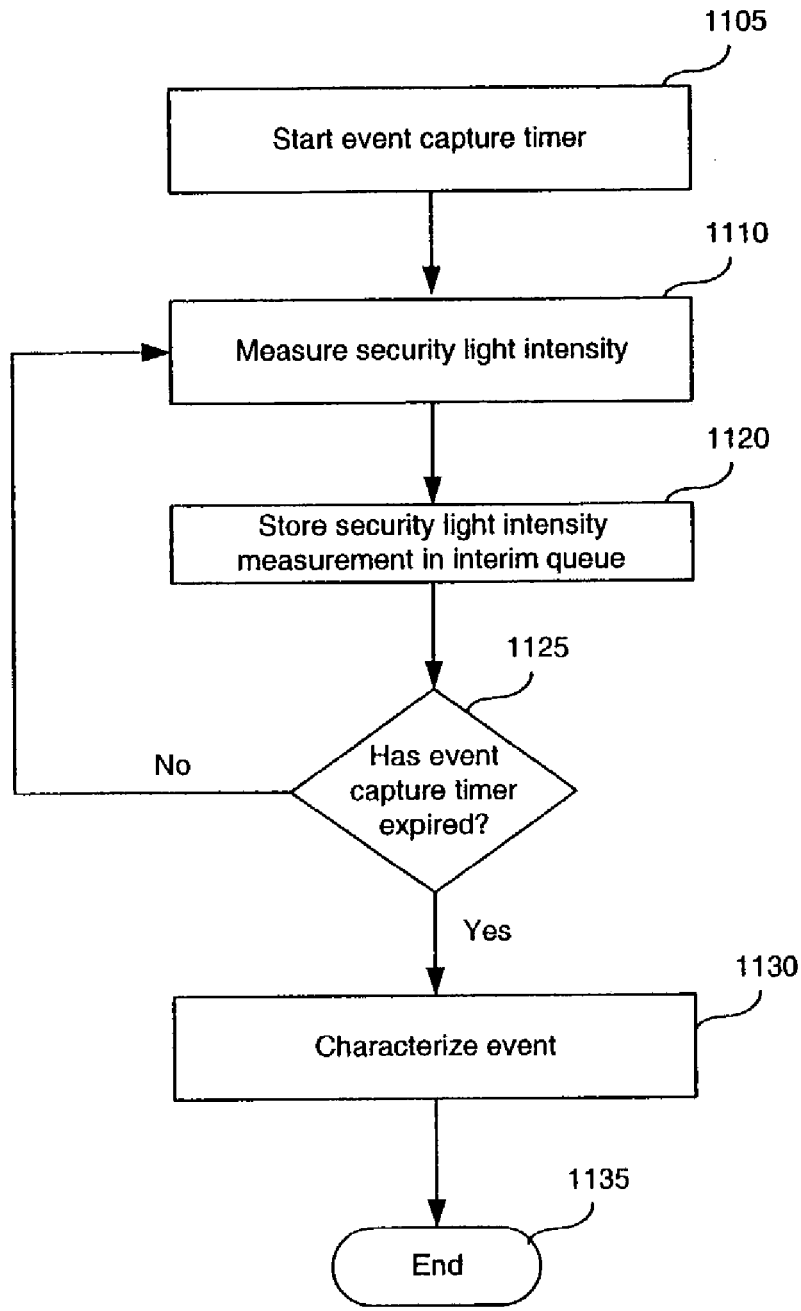
FIG. 11 is a flow chart of a method for collecting security light intensity measurements used to characterize an event, according to an embodiment of the invention.

The flow chart illustrated in FIG. 11 depicts a method 1100 for collecting light intensity measurements used to characterize an event, according to an embodiment of the invention. Method 1100 is launched when an active monitoring system, such as active monitoring system 160 and 165, detects an event within an actively monitored communications system, such as actively monitored communications system 150. Method 1100 begins in step 1105. In step 1105, an event capture timer is started. Referring to FIG. 15, this would be T1. In step 1110, a security light signal intensity measurement is taken. In step 1120, the security light signal intensity measurement taken in step 1110 is also stored in an interim queue.

In step 1125, a determination is made as to whether the event capture timer has expired. If the event capture timer has not expired, the process proceeds back to step 1110 to capture additional security light signal intensity measurements. The duration of the event capture timer is set based on how many data points will be used to characterize an event. A longer duration capture window will allow for a more precise characterization, while a shorter duration capture window will allow for a real time response to the particular event. In one embodiment, the event capture timer can be 2.2 seconds. Referring again to FIG. 15, this would the difference between T2 and T1. If the event capture timer has expired, the process proceeds to step 1130. In step 1130, the event is characterized. Method 1100 then proceeds to step 1135 and ends.

Figure 12:
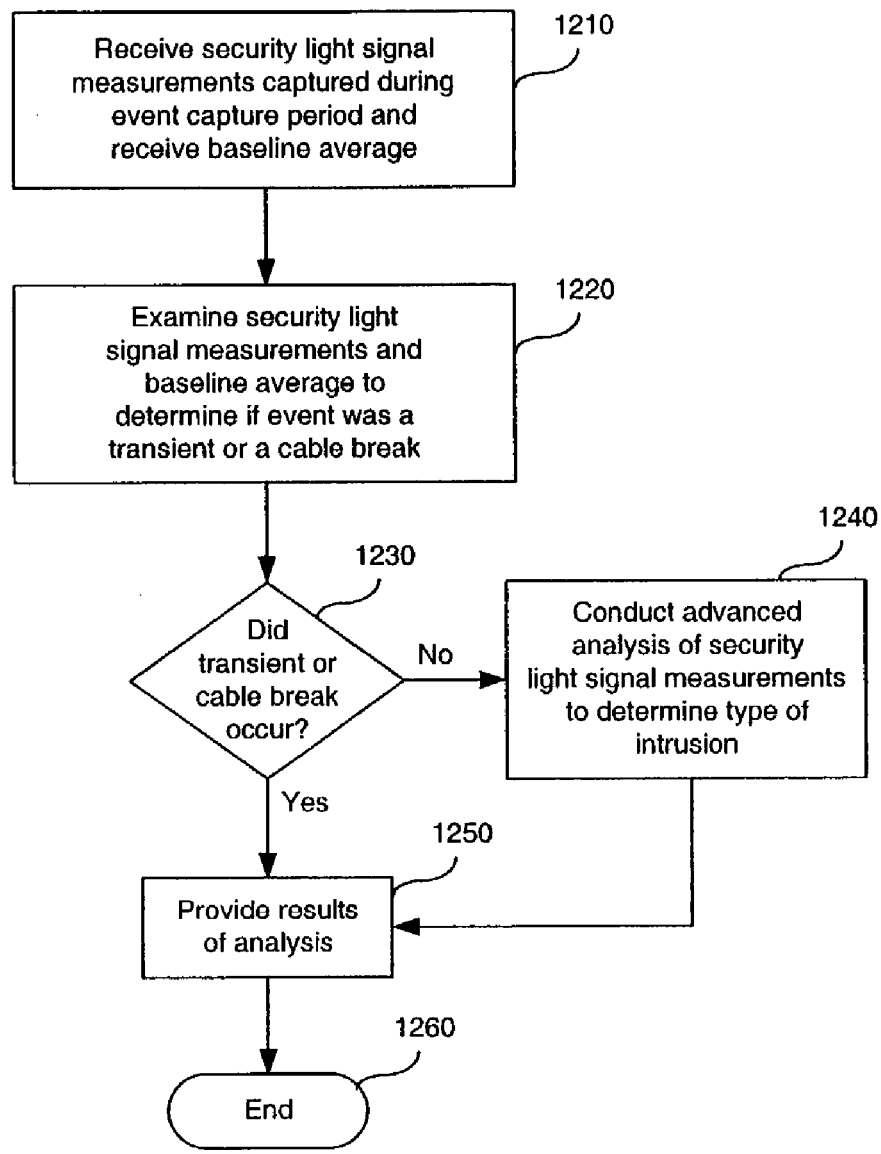
FIG. 12 is a flow chart of a method to characterize an event, according to an embodiment of the invention.

The flow chart illustrated in FIG. 12 depicts a method 1200 for characterizing an event, according to an embodiment of the invention. Method 1200 expands upon the activities encompassed by step 1130 of method 1100. Method 1200 begins in step 1210. In step 1210, security light signal measurements captured during an event capture period and a baseline average for the security light signal measurement are received. Referring to FIG. 15, the measurements would be those collected from T0 to T2 . In one embodiment, these measurements are provided to an event characterization engine, such as event characterization engine 340 from a decision analysis system, such as decision analysis system 240.

Additionally, the security light measurements are those measurements that are contained in an interim queue. Assuming that the event capture timer has been set to 2.2 seconds and the interim timer has been set to 3.2 seconds, the measurements that are provided to event characterization engine 340 will contain 3.2 seconds of light intensity measurements. Contained within these measurements will be 1 second of measurements that were taken before the event (referring to FIG. 15, this time is the time from T0 to T1) and 2.2 seconds of measurements that were taken after the event (referring to FIG. 15, this time is the time from T1 to T2 ).

In step 1220, the security light signal measurements and baseline average are examined to determine whether a transient or a cable break occurred on a fiber path. In step 1230, a determination is made whether either a transient or a cable break occurred. In one embodiment, this determination can be made by examining the last measurement. If this measurement is beneath a preset threshold, a determination can be made that a cable break has occurred. Referring to FIG. 15, in one example, this preset threshold is represented by the horizontal line intersecting point 1510 on the vertical axis. If this measurement is above a certain level, a determination can be made that the event was a transient interruption to the signal. Referring to FIG. 15, in one example, this level is represented by the horizontal line intersecting point 1530. If a determination is made that either of these occurred, method 1200 proceeds to step 1250.

If a determination is made that neither of these occurred, method 1200 proceeds to step 1240. In step 1240, advanced analysis of the security light measurements is conducted to characterize the type of intrusion that occurred. In one embodiment, a method employing second order derivatives of the curve represented by measurements collected can be examined and compared against data of signatures of types of intrusion mechanisms (e.g., different types of taps onto a fiber path.) In another embodiment, Fourier transforms can be applied to the security light signal measurements. Upon characterizing the type of intrusion that occurred, method 1200 proceeds to step 1250. In step 1250, the results of the event characterization are provided. In one embodiment, these results can be transmitted to an end user alarm system or monitor using an SNMP agent, such as SNMP agent 330. Method 1200 proceeds to step 1260 and ends.

Figure 13:
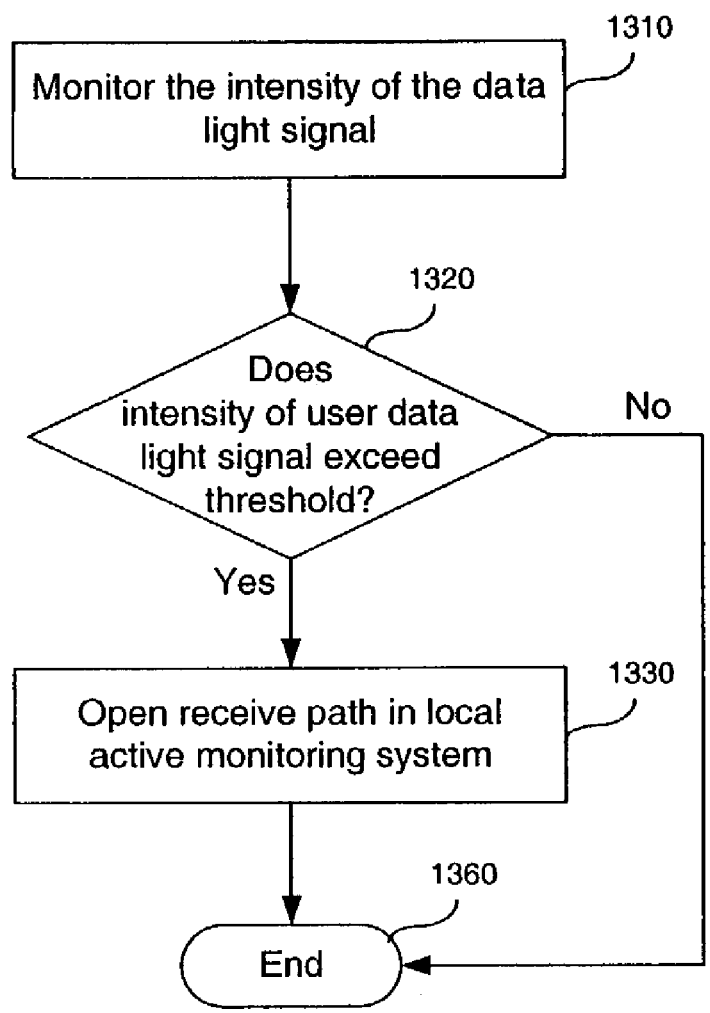
FIG. 13 is a flow chart of a method to protect an actively monitored communications system from intensity spikes in a user data light signal, according to an embodiment of the invention.

The flow chart illustrated in FIG. 13 provides a method 1300 to protect an actively monitored communications system from intensity spikes in a user data light signal, according to an embodiment of the invention. Method 1300 begins in step 1310. In step 1310, the intensity of a user data light signal is monitored. In one embodiment, a monitor, such as user data light signal monitor 270 can be used to monitor the signal. In step 1320, a determination is made whether the intensity of the user data light signal exceeds an alarm threshold. The alarm threshold can be a preset level or determined based on an average of user data light signals received for some duration of time. If a determination is made that an alarm threshold has not been exceeded, method 1300 proceeds to step 1360 and ends.

If a determination is made that an alarm threshold has been exceeded, method 1300 proceeds to step 1330. In step 1330, the receive fiber path in a local active monitoring system is opened, so that received user data light signals can not reach a communication equipment device. In one embodiment, a user data light signal monitor, such as user data light signal monitor 270 provides an alarm indication to a decision maker, such as decision maker 315. Decision maker 315 instructs optoelectronic switches 250, 252, or 254 to switch to a position that opens the transmit path. In step 1360, method 1300 ends.

Additionally, user data light signal monitor 270 can enable other applications. For example, when a local active monitoring system receives an indication from a user data light signal monitor 270 that no light is being detected, a local active monitoring system can send an administration message to a remote active monitoring system. The administration message will indicate that user data light signal monitor 270 has detected no light. Upon receipt of this message, a remote active monitoring system can determine that the reason that it is not receiving light is a result of no light being transmitted by the local communications equipment, rather than a cable break having occurred.

Figure 14A:
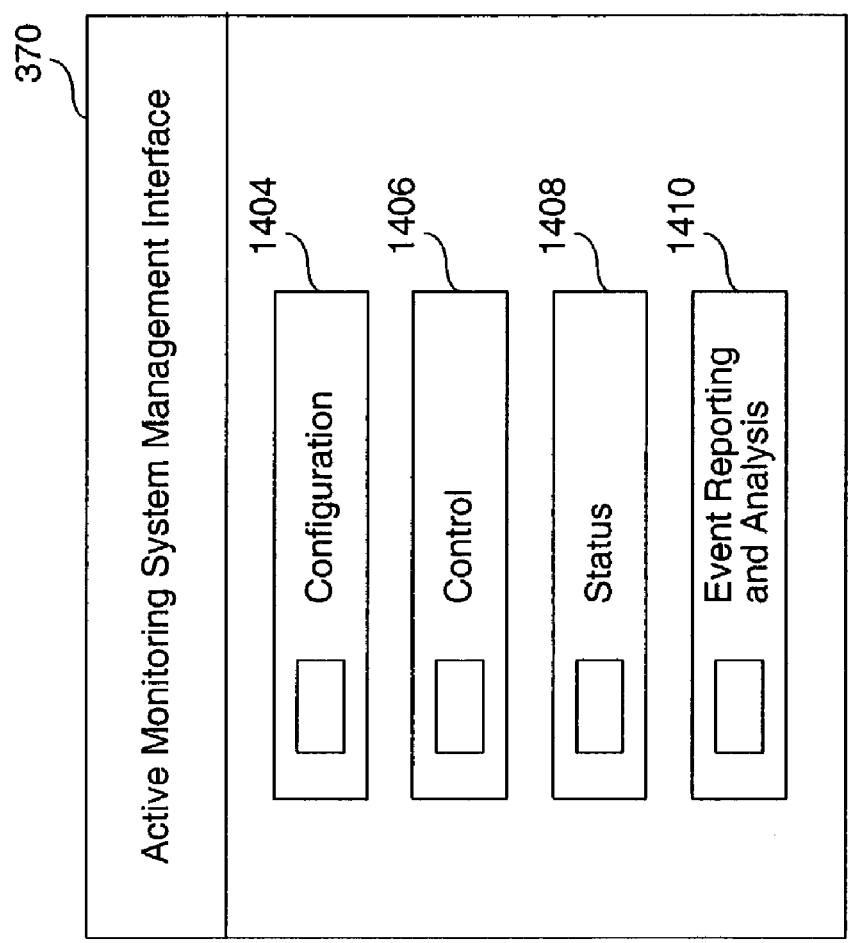
FIG. 14A is a user interface screen shot that shows an implementation of a management interface menu used to manage an active monitoring system, according to an embodiment of the invention.

FIG. 14A shows an example system management interface 370 that provides a user interface menu used to manage an active monitoring system, according to an embodiment of the invention. System management interface 370 consists of a configuration option 1404, control option 1406, status option 1408, and event reporting and analysis option 1410. Upon selection of configuration option 1404, system management interface 370 provides additional menus related to configuration of the system. Upon selection of control option 1406, system management interface 370 provides additional menus related to control of the system. Upon selection of status option 1408, system management interface 370 displays status information related to an actively managed communications system, such as actively monitored communications system 150. Upon selection of event reporting and analysis option 1410, management interface 370 displays additional menus related to reporting and characterizing events.

FIG. 14B is a user interface screen shot that shows an implementation of a control user interface 1420, according to an embodiment of the invention. Control user interface 1420 provides user definable control options to establish the configuration of the fiber paths that are being used. For example, control user interface 1420 can provide controls to switch the transmit and receive fiber paths from the primary to back-up paths and to set which combination of fiber paths will be used as the active or inactive paths for carrying user data light signals.

Figure 14C:
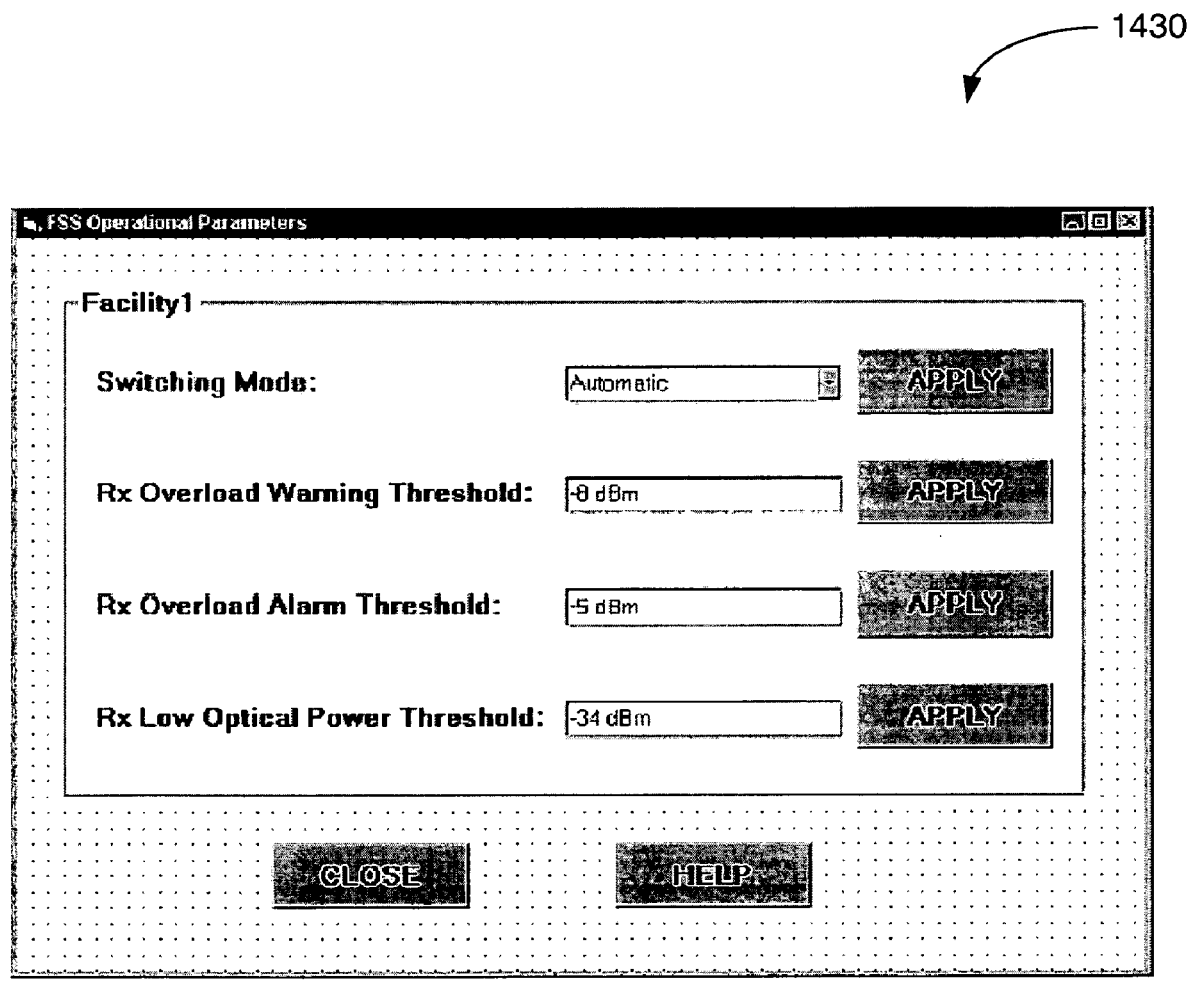
FIG. 14C is a user interface screen shot that shows an implementation of a control interface used to control an active monitoring system, according to an embodiment of the invention.

FIG. 14C is a user interface screen shot that shows an implementation of a configuration user interface 1430, according to an embodiment of the invention. Configuration user interface 1430 provides user definable options to set the switching mode (i.e., whether an active monitoring system will automatically switch to an alternative path when an alarm is detected). Configuration interface 1430 also provides threshold levels for determining when a change in the intensity level of a user data light signal should constitute a control action, and what type of control action should be taken.

Figure 14D:
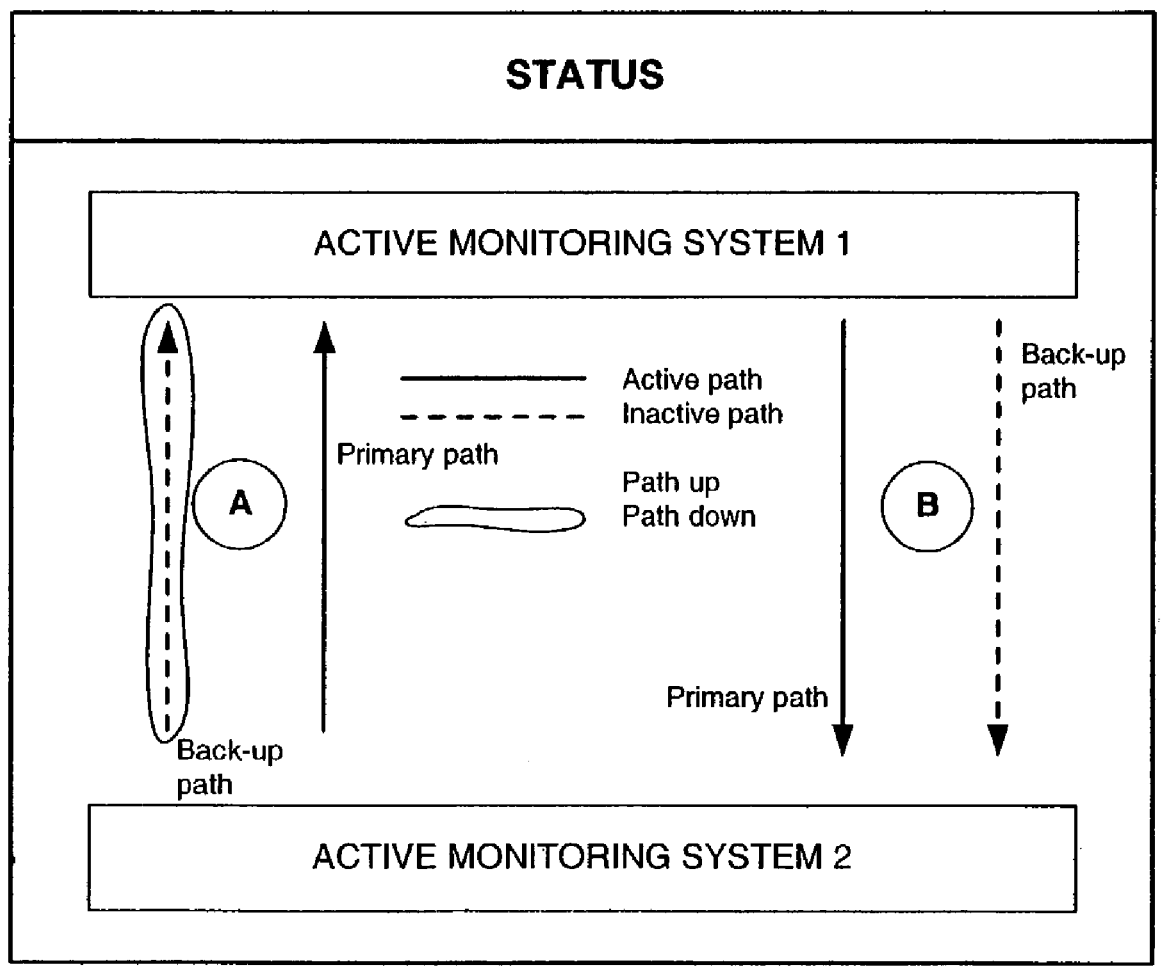
FIG. 14D is a user interface screen shot that shows an implementation of a status interface used to monitor the status of an active monitoring system, according to an embodiment of the invention.

FIG. 14D is a user interface screen shot that shows an implementation of a status user interface 1440, according to an embodiment of the invention. Status user interface 1440 provides information on the status of active monitoring systems being used and the fiber paths between them. For example, status user interface 1440 displays whether any fiber paths are out of service or down and which fiber paths are actively carrying user data.

Figure 14E:
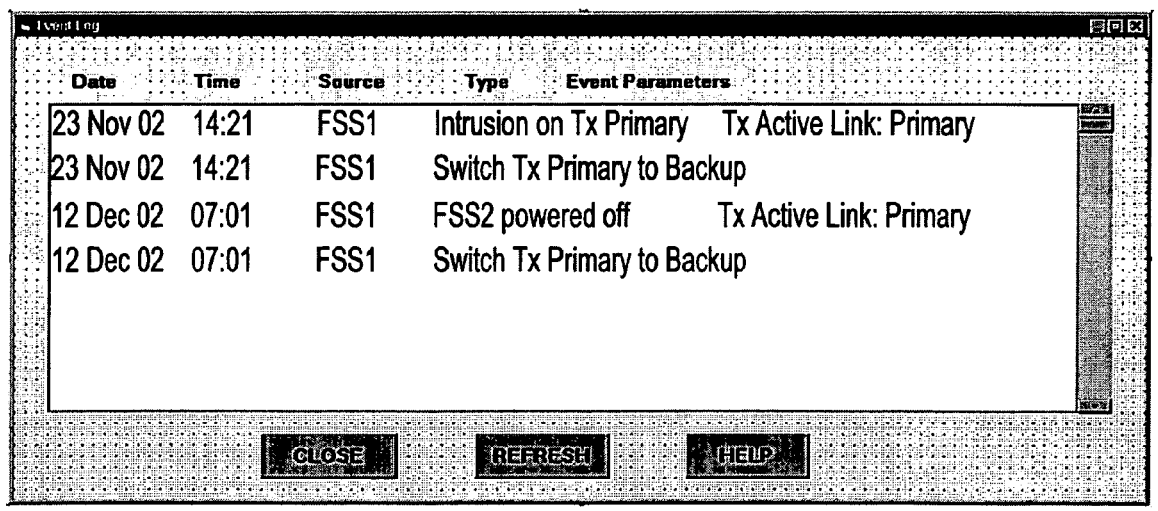
FIG. 14E is a user interface screen shot that shows an implementation of an event reporting and analysis interface used to report and analyze events detected by an active monitoring system, according to an embodiment of the invention.

FIG. 14E is a user interface screen shot that shows an implementation of an event reporting and analysis interface 1450. Event reporting and analysis interface 1450 provides reports of events that have occurred and enables further analysis of an event. For example, event reporting and analysis interface 1450 can display a list of events that occurred on each path, provide graphical representations showing the intensity of the received security light signal over time, and provide options for the selection of a particular type of analysis to be used to characterize events. FIG. 14E illustrates a display of reported events.

CONCLUSION

Exemplary embodiments of the invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the invention should not be limited by any of the above-described exemplary embodiments, but should be defined only in accordance with the following claims and their equivalents.

What is claimed is:

1. An active monitoring system to monitor the integrity of a fiber optic communications link in which the fiber optic communications link carries user data within a user data light signal at a primary wavelength between two communication devices; wherein the active monitoring system uses a primary and a back-up user data light signal receive path to transmit a security light signal and uses a primary and a back-up user data light signal transmit path to receive a security light signal, comprising:
    (a) a codec that digitally encodes and decodes administration messages;
    (b) a first light detector that measures the intensity of a received security light signal on the primary user data light signal transmit path;
    (c) a second light detector that measures the intensity of a received security light signal on the back-up user data light signal transmit path;
    (d) a decision analysis system, wherein said decision analysis system is coupled to said first light detector and said second light detector to assess the integrity of the fiber optic communications link and initiate a control action;
    (e) a first light source coupled to said codec that transmits a security light signal on the primary user data light signal receive path;
    (f) a second light source coupled to said codec that transmits a security light signal on the back-up user data light signal receive path;
    (g) a first switch (S1) coupled to said decision analysis system for switching a user data light signal transmit path between the primary user data light signal transmit path and the back-up user data light signal transmit path;
    (h) a second switch (S3) coupled to said decision analysis system for switching a user data light signal receive path between the primary user data light signal receive path and the back-up user data light signal receive path and;
    (i) a third switch (S2) coupled to said decision analysis system for switching a user data light signal transmit path between the back-up user data light signal transmit path and an open optical path.

2. The active monitoring system of claim 1, further comprising:
    (j) a first wavelength division multiplexer coupled to said first light source; and
    (k) a second wavelength division multiplexer coupled to said second light source.

3. The active monitoring system of claim 2, further comprising:
    (l) a third wavelength division multiplexer coupled to said first light detector; and
    (m) a fourth wavelength division multiplexer coupled to said second light detector.

4. A decision analysis system to monitor the integrity of a fiber optic communications link, wherein a light detector coupled to the decision analysis system detects an intensity of a security light signal traveling through the fiber optic communications link, comprising:
    (a) a light intensity analyzer that receives from the light detector measurements of the intensity of the security light signal and provides a plurality of outputs containing processed data about the intensity of the security light signal, wherein said light intensity analyzer includes:
        (i) a sample queue that stores measurements received from the light detector;
        (ii) an interim queue that stores measurements received from the light detector;
        (iii) a baseline queue that stores average measurements, wherein each average measurement is an average of all of the measurements in said interim queue; and
        (iv) a controller for managing the flow of data into and out of each of said sample queue, said interim queue and said baseline queue, wherein said controller further performs calculations on data stored in each of said sample queue, said interim queue and said baseline queue;
    (b) a codec that decodes and encodes administration messages; and
    (c) a decision maker coupled to said light intensity analyzer and said codec that takes control actions based on the plurality of outputs received from said light intensity analyzer and said codec.

5. The system of claim 4, wherein said plurality of outputs provided in step (a) comprise a sample measurement and a baseline measurement.

6. The system of claim 4, wherein a management system is coupled to said decision analysis system, said management system comprising an SNMP agent and an event characterization engine.

7. The system of claim 6, wherein said management system further comprises a terminal agent.

8. A method to transmit a security light signal by a local active monitoring system over a fiber optic communications link carrying a user data light signal, wherein the local active monitoring system is coupled to one end of the fiber optics communications link and a remote local active monitoring system is coupled to the opposite end of the fiber optics communications link, comprising:

(a) determining the status of the fiber optics communications link and the local active monitoring system;
(b) determining a type of event that occurred;
(c) generating an administration message;
(d) transmitting a security light signal that contains said administration message; and
(e) wavelength division multiplexing said security light signal with the user data light signal, wherein prior to powering down, the local active monitoring system transmits an administration message to the remote active monitoring system, wherein upon receipt of the administration message the remote active monitoring system takes a control action to ensure continuity of the fiber optics communications link.

9. The method of claim 8, further comprising inserting an encryption code sequence in the administration message.

10. The method of claim 8, wherein a wavelength of the security light signal is different from a wavelength of the user data light signal.

11. The method of claim 8, wherein the security light signal is transmitted in a direction that is opposite to the direction of the user data light signal.

12. The method of claim 8, wherein the local active monitoring system uses a security light signal received from the remote active monitoring system on a user data light signal transmit path to monitor the user data light signal transmit path, wherein the user data light signal transmit path originates from a local communication equipment device that is coupled at the same end of the fiber optic communications link as the local active monitoring system.

13. The method of claim 8, wherein the security light signal is transmitted in a direction that is the same as the direction of the user data light signal.

14. The method of claim 8, wherein the security light signal is transmitted between active monitoring systems in a manner that is substantially transparent to communications equipment that is transmitting and receiving the user data light signals.

15. The method of claim 8, wherein steps (a) through (e) are performed without substantially impacting the user data light signal.

16. The method of claim 8, wherein steps (a) through (e) can be performed independent of a protocol used to transmit the user data light signal.

17. The method of claim 8, wherein the fiber optic communications link has a primary and back-up link in which either the primary or the back-up link will be active carrying the user data light signal and the other inactive and not carrying a user data light signal, wherein security light signals are used to monitor both the active and inactive links.

18. The method of claim 8, wherein said status in step (a) comprises:

(a) a primary fiber link status;
(b) a back-up fiber link status; and
(c) an active fiber link status.

* * * * *